US010963270B2

(12) United States Patent
Kirkpatrick et al.

(10) Patent No.: US 10,963,270 B2
(45) Date of Patent: Mar. 30, 2021

(54) IDENTIFIERS ACROSS APPLICATION INSTANCES

(71) Applicant: Google LLC, Mountain View, CA (US)

(72) Inventors: Ficus Kirkpatrick, Los Altos Hills, CA (US); Subramaniam Ganapathy, Mountian View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/540,846

(22) Filed: Aug. 14, 2019

(65) Prior Publication Data

US 2019/0370018 A1 Dec. 5, 2019

Related U.S. Application Data

(63) Continuation of application No. 15/406,527, filed on Jan. 13, 2017, now Pat. No. 10,409,657.

(Continued)

(51) Int. Cl.
*G06F 15/16* (2006.01)
*G06F 9/445* (2018.01)
(Continued)

(52) U.S. Cl.
CPC ............ *G06F 9/44505* (2013.01); *G06F 8/61* (2013.01); *G06F 8/65* (2013.01); *G06F 9/445* (2013.01);
(Continued)

(58) Field of Classification Search
CPC ...... G06F 9/44505; G06F 9/546; G06F 9/445; G06F 9/44521; G06F 8/61; G06F 8/65;
(Continued)

(56) References Cited

U.S. PATENT DOCUMENTS 5,639,088 A * 6/1997 Schneider ............... G07F 17/32
273/138.2
6,292,933 B1 * 9/2001 Bahrs .................... H02M 3/285
707/999.202

(Continued)

FOREIGN PATENT DOCUMENTS

CN 101373439 A 2/2009
CN 102147744 A 8/2011
(Continued)

OTHER PUBLICATIONS

"6.The IoC container," The Spring Framework, retrieved on Jan. 8, 2016, from http://docs.spring.io/spring/docs/current/spring-framework-reference/html/beans.html, 152 pp.

(Continued)

*Primary Examiner* — Richard G Keehn
(74) *Attorney, Agent, or Firm* — Shumaker & Sieffert, P.A.

(57) ABSTRACT

In some examples, a method includes receiving, by a supervisor component executing at a computing device, a request to execute an application, determining a current user of the computing device, and determining a reset state of the application. The method may also include generating, based on the current user of the computing device, the reset state, and an application identifier for the application, a unique identifier that does not include personally identifiable information for the current user, sending, to an application service provider, the unique identifier and one or more requests for information, and, responsive to sending the one or more request for information, receiving, from the application service provider, state information associated with the current user and for the application.

20 Claims, 6 Drawing Sheets

Related U.S. Application Data

(60) Provisional application No. 62/279,571, filed on Jan. 15, 2016.

(51) Int. Cl.

| | | |
|---|---|---|
| *H04L 29/08* | (2006.01) | |
| *H04L 12/24* | (2006.01) | |
| *G06F 8/61* | (2018.01) | |
| *G06F 8/65* | (2018.01) | |
| *G06F 9/54* | (2006.01) | |

(52) U.S. Cl.
CPC .......... *G06F 9/44521* (2013.01); *G06F 9/546* (2013.01); *H04L 41/02* (2013.01); *H04L 67/142* (2013.01); *H04L 67/146* (2013.01); *H04L 67/148* (2013.01); *H04L 67/34* (2013.01)

(58) Field of Classification Search
CPC ... H04L 67/142; H04L 67/146; H04L 67/148; H04L 67/34; H04L 41/02
See application file for complete search history.

(56) References Cited

U.S. PATENT DOCUMENTS

| | | | |
|---|---|---|---|
| 6,317,143 B1 | 11/2001 | Wugofski | |
| 6,754,896 B2 | 6/2004 | Mishra et al. | |
| 6,848,997 B1* | 2/2005 | Hashimoto | A63F 13/79 463/42 |
| 7,181,686 B1* | 2/2007 | Bahrs | G06F 8/38 715/210 |
| 7,206,844 B2* | 4/2007 | Gupta | G06F 9/54 709/203 |
| 7,698,383 B2* | 4/2010 | Goring | G06F 9/546 709/219 |
| 7,707,574 B2 | 4/2010 | Goring et al. | |
| 8,095,940 B2 | 1/2012 | Bissett et al. | |
| 8,112,749 B2 | 2/2012 | Jelinek et al. | |
| 8,495,625 B1 | 7/2013 | Sanders | |
| 8,619,626 B2 | 12/2013 | Schneyer et al. | |
| 8,732,238 B2 | 5/2014 | Steakley | |
| 8,782,744 B1 | 7/2014 | Fuller et al. | |
| 8,832,296 B2 | 9/2014 | Yandek et al. | |
| 8,943,150 B2 | 1/2015 | Massey et al. | |
| 9,612,815 B1* | 4/2017 | Jagtap | G06F 9/45533 |
| 9,675,890 B2 | 6/2017 | Ahiska et al. | |
| 9,705,973 B2* | 7/2017 | Austel | H04L 67/025 |
| 9,772,835 B1 | 9/2017 | Trautmann et al. | |
| 9,773,102 B2* | 9/2017 | Graham | G06F 21/6218 |
| 9,817,648 B2 | 11/2017 | Kirkpatrick | |
| 9,854,047 B2* | 12/2017 | Elias | H04L 67/34 |
| 9,871,745 B2 | 1/2018 | Steinder et al. | |
| 9,898,397 B2 | 2/2018 | Arif et al. | |
| 10,268,531 B2 | 4/2019 | Kirkpatrick et al. | |
| 10,324,734 B2 | 6/2019 | Kirkpatrick | |
| 10,409,657 B2 | 9/2019 | Kirkpatrick et al. | |
| 2004/0103412 A1 | 5/2004 | Rao et al. | |
| 2005/0049790 A1 | 3/2005 | Holman et al. | |
| 2005/0193139 A1 | 9/2005 | Vinson et al. | |
| 2006/0075381 A1 | 4/2006 | Laborczfalvi et al. | |
| 2008/0040802 A1 | 2/2008 | Pierson et al. | |
| 2009/0055816 A1 | 2/2009 | Akada | |
| 2009/0133014 A1 | 5/2009 | Laurila et al. | |
| 2009/0265788 A1 | 10/2009 | Ehrenschwender et al. | |
| 2010/0262953 A1 | 10/2010 | Barboni et al. | |
| 2010/0313196 A1* | 12/2010 | De Atley | G06F 8/61 717/174 |
| 2011/0119684 A1 | 5/2011 | Suggs et al. | |
| 2012/0108326 A1* | 5/2012 | Hall | A63F 13/79 463/42 |
| 2013/0019237 A1 | 1/2013 | Pardehpoosh et al. | |
| 2013/0067600 A1 | 3/2013 | Graham et al. | |
| 2013/0204975 A1 | 8/2013 | Keith, Jr. | |
| 2013/0324263 A1 | 12/2013 | Ahiska et al. | |
| 2013/0325967 A1 | 12/2013 | Parks et al. | |
| 2013/0346958 A1 | 12/2013 | Cohen et al. | |
| 2014/0007074 A1 | 1/2014 | Sporkert et al. | |
| 2014/0033196 A1 | 1/2014 | Biswas et al. | |
| 2014/0215451 A1 | 7/2014 | Nachtigal | |
| 2014/0229951 A1 | 8/2014 | Zhang | |
| 2014/0237087 A1 | 8/2014 | Elias et al. | |
| 2014/0282884 A1 | 9/2014 | Bao | |
| 2014/0289807 A1* | 9/2014 | Collado | G06F 21/53 726/4 |
| 2014/0365336 A1* | 12/2014 | Hurewitz | G06Q 30/0625 705/26.62 |
| 2015/0242622 A1 | 8/2015 | Xu et al. | |
| 2015/0301824 A1 | 10/2015 | Patton et al. | |
| 2016/0173540 A1* | 6/2016 | Linden | H04L 65/1083 705/26.8 |
| 2016/0261716 A1 | 9/2016 | Khalaf et al. | |
| 2017/0206071 A1 | 7/2017 | Kirkpatrick | |
| 2017/0206090 A1 | 7/2017 | Kirkpatrick | |
| 2017/0206123 A1 | 7/2017 | Kirkpatrick | |
| 2017/0208137 A1 | 7/2017 | Kirkpatrick et al. | |
| 2018/0060055 A1 | 3/2018 | Kirkpatrick | |
| 2019/0155667 A1 | 5/2019 | Kirkpatrick et al. | |

FOREIGN PATENT DOCUMENTS

| | | |
|---|---|---|
| CN | 102395952 A | 3/2012 |
| CN | 102460388 A | 5/2012 |
| CN | 103701947 A | 4/2014 |
| JP | 2002358208 A | 12/2002 |
| JP | 2004529419 A | 9/2004 |
| JP | 2006259806 A | 9/2006 |
| JP | 2008090578 A | 4/2008 |
| KR | 1020070109310 A | 11/2007 |
| WO | 2011080615 A1 | 7/2011 |
| WO | 2013101950 A1 | 7/2013 |
| WO | 2014193434 A1 | 12/2014 |

OTHER PUBLICATIONS

Escoffier et al., "iPOJO: an Extensible Service-Oriented Component Framework," IEEE International Conference on Services Computing, Grenoble University, Jul. 9-13, 2007, 8 pp.
Buck et al., "An API for Runtime Code Patching," International Journal of High Performance Computing Applications, vol. 14 Issue 4, Nov. 2000, pp. 317-329.
"App Container Image," GitHub, Inc., retrieved on Dec. 9, 2015, from https://github.com/appc/spec/blob/master/spec/aci.md, 7 pp.
"App Container Specification," GitHub, Inc., retrieved on Jun. 11, 2015, from https://github.com/appc/spec/blob/master/SPEC.md#app-container-image, 2 pp.
"App Container Pods," GitHub Inc., retrieved on Dec. 9, 2015, from https://github.com/appc/spec/blob/master/spec/pods.md, 5 pp.
Jianhui et al., "Run-Time Data-Flow Analysis," Journal of Computer Science & Technology, vol. 17 Issue 4, Jul. 2002, pp. 442-449.
"App Thinning (iOS, tvOS, watchOS)," Apple Inc., Oct. 21, 2015, from https://developer.apple.com/library/watchos/documentation/IDEs/Conceptual/AppDistributionGuide/AppThinning/AppThinning.html, 4 pp.
Solomon, "App Thinning in IOS 9 & NSBundlerSourceRequest," Mutual Mobile, Nov. 5, 2015, https://mutualmobile.com/posts/app-thinning-in-ios-9-nsbundleresourcerequest, 7 pp.
"Accessing and Downloading On-Demand Resources," Apple Inc., Oct. 21, 2015, from https://developer.apple.com/library/ios/documentation/FileManagement/Conceptual/On_Demand_Resources_Guide/Managing.html, 7 pp.
"On-Demand Resources Essentials," Apple Inc., Oct. 25, 2015, from https://developer.apple.com/library/ios/documentation/FileManagement/Conceptual/On_Demand_Resources_Guide/index.html#//apple_ref/doc/uid/TP40015083 . . . , 6 pp.
Allen et al., "Serialization Sets: A Dynamic Dependence-Based Parallel Execution Model," Principles and Practice of Parallel Programming, vol. 44 Issue 4, Apr. 2009, pp. 85-96.

(56) References Cited

OTHER PUBLICATIONS

Tarantino, "Prefetching/Preloading and Prerendering content with HTML," Blog: Jack of Spades https://jack.ofspades.com/prefetching-preloading-and-prerendering-content-with-html/, Jan. 4, 2015, 6 pp.
Karle, "Operating System Containers vs. Application Containers," Rising Stack Engineering, May 19, 2015, 13 pp.
"Docker Engine," Docker Inc., retrieved on Jan. 25, 2017, from https://www.docker.com/, 10 pp.
"Modern Application Architecture for the Enterprise | Delivering agility, portability, and control with Docker Containers as a Service (CaaS)," Docker Inc., Jan. 21, 2016, 6 pp.
Engberg et al., "Privacy Authentication—Persistent Non-Identification in Ubiquitous Environments," Open Business Innovation, Aug. 18, 2002, 6 pp.
Shende, "Enhancing Privacy in Intercloud Interaction," IRF International Conference, Apr. 27, 2014, 185 pp.
"About Bundles," Apple Inc., Jun. 30, 2015, from https://developer.apple.com/library/mac/documentation/CoreFoundation/Conceptual/CFBundles/AboutBundles/AboutBundles.html, 6 pp.
"12 Applet Development Guide," Oracle Inc., retrieved on Dec. 29, 2015, from https://docs.oracle.com/javase/8/docs/technotes/guides/deploy/applet_dev_guide.html, 13 pp.
"Class Loading," Oracle Inc., retrieved on Dec. 29, 2015, from http://docs.oracle.com/javase/jndi/tutorial/beyond/misc/classloader.html, 4 pp.
"Docker (software)," Wikipedia, retrieved on Dec. 29, 2015, from https://en.wikipedia.org/wiki/Docker_(software), 6 pp.
"Is Applet jar downloaded by browser or by JVM?," Stack Overflow, Jun. 25, 2011, from http://stackoverflow.com/questions/6475838/is-applet-jar-downloaded-by-browser-or-by-jvm, 2 pp.
Venners, "Security and the Class Loader Architecture," JavaWorld, Aug. 1997, http://www.artima.com/underthehood/classloaders.html, 9 pp.
McGraw et al., "The Base Java Security Model: The Original Applet Sandbox," Ch. 2 Sec. 7, John Wiley & Sons, Inc., retrieved on Jan. 25, 1997, from http://www.securingjava.com/chapter-two/chapter-two-7.html, 7 pp.
Kleyman, "Understanding Application Containers and OS-Level Virtualization," Data Center Knowledge, retrieved on Jan. 5, 2015, from http://www.datacenterknowledge.com/archives/2015/01/05/understanding-application-containers-and-os-level-virtualization/, 3 pp.
"Multi Class Java Applet," Stack Overflow, Mar. 14, 2011, from http://stackoverflow.com/questions/5294872/multi-class-java-applet/2#2, 2 pp.
Vaughn-Nichols, "What is Docker and why is it so darn popular," ZDNet, Aug. 4, 2014, retrieved from http://www.zdnet.com/article/what-is-docker-and-why-is-it-so-darn-popular/, 10 pp.
Horstmann et al, "Core JAVA 2 vol. 1—Fundamentals," Sun Microsystems Inc., Dec. 18, 2000, pp. 624.
"NSBundleResourceRequest," Apple Inc., Sep. 16, 2015, from https://developer.apple.com/library/ios/documentation/Foundation/Reference/NSBundleResourceRequest_Class/, 2 pp.
U.S. Appl. No. 15/406,502, filed by Kirkpatrick, filed Jan. 13, 2017.
U.S. Appl. No. 15/406,511, filed by Kirkpatrick, filed Jan. 13, 2017.
U.S. Appl. No. 15/406,520, filed by Kirkpatrick, filed Jan. 13, 2017.
U.S. Appl. No. 14/997,167, filed by Kirkpatrick, filed Jan. 15, 2017.
Kinney, "Getting started with Microsoft Application Virtualization", TechNet Magazine Nov. 2008. Retrieved from the Internet: <https://technet.microsoft.com/en-us/library/2008.10.appv.aspx?f=255&MSPPError=-2147217396> 4 pp.
"Microsoft App-V", Wikipedia, the free Encyclopedia, revised on Jan. 29, 2010. Retrieved from the Internet: <https://en.wikipedia.org/wiki/Microsoft_App-V> 5 pp.
Yang et al., "Application Streaming: A Mobile Application Distribution Method", School of Information Science and Engineering, Central South University, Dec. 16, 2015. Retrieved from the Internet: <https://link.springer.com/chapter/10.1007/978-3-319-27119-4_21> 14 pp.
Kircher et al., "Pooling", Corporate Technology, Siemens AG, May 10, 2003. Retrieved from the Internet: <http://www.kircher-schwanninger.de/michael/publications/Pooling.pdf> 11 pp.
International Search Report and Written Opinion of International Application No. PCT/US2017/013545, dated Jun. 7, 2017, 11 pp.
International Preliminary Report on Patentability from International Application No. PCT/US2017/013545, dated Jul. 26, 2018, 6 pp.
U.S. Appl. No. 16/254,526, filed Jan. 22, 2019.
Office Action, and translation thereof, from counterpart Korean Application No. 10-2018-7012400, dated Feb. 21, 2019, 6 pp.
Office Action, and translation thereof, from counterpart Japaneses Application No. 2018-519400, dated Dec. 11, 2018, 11 pp.
The Notice of Acceptance, and translation thereof, from counterpart Korean Application No. 10-2018-7012400, dated Apr. 29, 2019, 10 pp.
Communication under Rule 71(3) EPC from counterpart European Application No. 17703845.2, dated Jul. 1, 2019, 7 pp.
Prosecution History from U.S. Appl. No. 15/406,527, dated Feb. 12, 2019 through Aug. 8, 2019, 26 pp.
Extended Search Report from counterpart European Application No. 19199042.3, dated Feb. 11, 2020, 8 pp.
Response to Extended European Search Report dated Feb. 11, 2020 from counterpart European Application No. 19199042.3 filed Sep. 7, 2020, 20 pp.
First Office Action and Search Report, and translation thereof, from counterpart Chinese Application No. 201780003810.4, dated Oct. 29, 2020, 17 pp.
Examination Report from counterpart Indian Application No. 201847014124, dated Nov. 5, 2020, 8 pp.

\* cited by examiner

IDENTIFIERS ACROSS APPLICATION INSTANCES

This application is a continuation of U.S. patent application Ser. No. 15/406,527, filed on Jan. 13, 2017, which claims the benefit of U.S. Provisional Patent Application No. 62/279,571, filed Jan. 15, 2016, the entire contents of each of which are hereby incorporated by reference.

BACKGROUND

Computing devices can perform various functions, such as executing applications, receiving user input, and outputting information for display. For instance, computing devices may execute applications, such as an email client, travel assistant, messaging client, and the like. In order to maintain state information across devices (e.g., user preferences, user interest information, historical user behavior information, etc.), the user typically is required to create user account for the application or otherwise provide personally identifiable information so that servers associated with the application may store the state information such that, when the user logs in at the different device or after an application reinstall, the servers may identify the user and send the state information for the user to the device.

SUMMARY

In general, techniques of the present disclosure enable applications and computing devices to maintain state information across devices and across application installs and uninstalls without requiring a stable identifier. For example, rather than requiring a user to log into each application or each device in order to use the state information for the particular application or device, techniques of this disclosure enable applications to use an opaque identifier that is unique for each application and user and provides this opaque identifier to the application. The identifier is an opaque identifier in that it does not include information that personally identifies the user, but may be consistent across devices and across application reinstalls. The application developer may use this opaque identifier to provide the state information to the various other devices or application installs. That is, techniques of this disclosure may not only provide a mechanism by which state information may be maintained between computing devices without requiring the user to provide personally identifiable information to the developer, but the techniques of this disclosure may also enable a computing device to uninstall and reinstall applications in a way that is transparent to a user of the computing device by maintaining state information across the application reinstalls.

In one example, a method includes receiving, by a supervisor component executing at a computing device, a request to execute an application, and, responsive to determining that an application container for maintaining installable sub-packages of the application is allocated in memory of the computing device: determining, by a container runtime of the application container, a current user of the computing device, determining, by the container runtime, a reset state of the application, generating, by the container runtime and based on the current user of the computing device, the reset state, and an application identifier for the application, a unique identifier that does not include personally identifiable information for the current user, sending, by the computing device and to an application service provider, the unique identifier and one or more requests for information, and, responsive to sending the one or more request for information, receiving, by the computing device and from the application service provider, state information associated with the current user and for the application.

In another example, a computing device includes one or more storage devices that store a supervisor component, and one or more processors. The one or more processors execute the supervisor component to: receive a request to execute an application, and determine whether an application container for maintaining installable sub-packages of the application is allocated in the one or more storage devices. the one or more processors execute the application container to, responsive to determining that an application container for maintaining installable sub-packages of the application is allocated in the one or more storage devices: determine a current user of the computing device, determine a reset state of the application, generate, based on the current user of the computing device, the reset state, and an application identifier for the application, a unique identifier that does not include personally identifiable information for the current user, send, to an application service provider, the unique identifier and one or more requests for information, and, responsive to sending the one or more request for information, receive, from the application service provider, state information associated with the current user and for the application.

In another example, a method includes receiving, by a computing system and from an application executing at a first computing device, an identifier that uniquely identifies a user of the first computing device and does not include personally identifying information, receiving, by the computing system and from the application executing at the first computer, one or more requests for information, the one or more requests including a request for user preference information, and updating, by the computing system and based on information about the one or more requests and the identifier, one or more historical request information associated with the identifier, the historical information including user preference information associated with the identifier. The method may also include receiving, by the computing system and from an application executing at a second computing device, the identifier, wherein the application executing on the first computing device and the application executing on the second computing device are different instances of a single application, determining, by the computing system and based on the identifier, user preference information included in the historical request information associated with the identifier, and sending, by the computing system and to the second computing device, at least portion of the user preference information included in the historical request information associated with the identifier.

In another example, an apparatus includes means for receiving a request to execute an application, means for determining a current user of the computing device, means for determining a reset state of the application, means for generating, based on the current user of the computing device, the reset state, and an application identifier for the application, a unique identifier that does not include personally identifiable information for the current user, means for sending, to an application service provider, the unique identifier and one or more requests for information, and means for receiving, from the application service provider, state information associated with the current user and for the application.

In another example, an apparatus includes means for receiving, from an application executing at a first computing device, an identifier that uniquely identifies a user of the first computing device and does not include personally identifying information, means for receiving, from the application executing at the first computer, one or more requests for information, the one or more requests including a request for user preference information, and means for updating, based on information about the one or more requests and the identifier, one or more historical request information associated with the identifier, the historical information including user preference information associated with the identifier. The apparatus may also include means for receiving, from an application executing at a second computing device, the identifier, wherein the application executing on the first computing device and the application executing on the second computing device are different instances of a single application, means for determining, based on the identifier, user preference information included in the historical request information associated with the identifier, and means for sending, to the second computing device, at least portion of the user preference information included in the historical request information associated with the identifier The details of one or more examples are set forth in the accompanying drawings and the description below. Other features, objects, and advantages of the disclosure will be apparent from the description and drawings, and from the claims.

DETAILED DESCRIPTION

Figure 1:
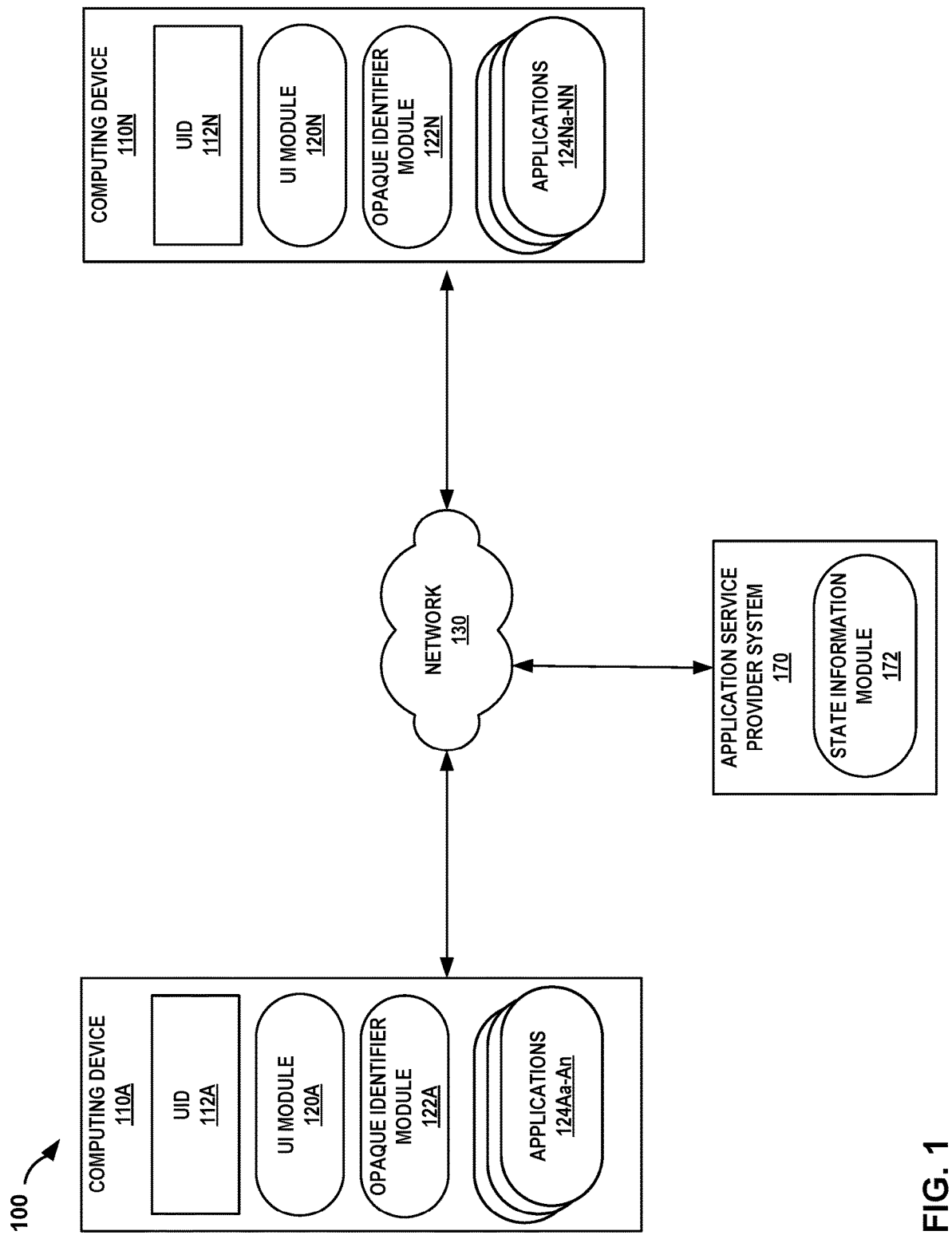
FIG. 1 is a block diagram illustrating an example computing system for providing identifiers across application instances, in accordance with techniques of this disclosure.

FIG. 1 is a block diagram illustrating an example computing system for providing identifiers across application instances, in accordance with techniques of this disclosure. System 100 of FIG. 1 includes application service provider system 170 in communication with, via network 130, computing devices 110A-110N (collectively, "computing devices 110").

Network 130 represents any public or private communications network, for instance, cellular, Wi-Fi, and/or other types of networks, for transmitting data between computing systems, servers, and computing devices. For example, application service provider system 170 may exchange data, via network 130, with computing devices 110 to provide shared application state information when computing devices 110 are connected to network 130 and computing devices 110 may exchange data, via network 130, to synchronize a reset state of the state information, among other data. Network 130 may include one or more network hubs, network switches, network routers, or any other network equipment, that are operatively inter-coupled thereby providing for the exchange of information between computing devices 110 and application service provider system 170. Computing devices 110 and application service provider system 170 may transmit and receive data across network 130 using any suitable communication techniques. Computing devices 110 and application service provider system 170 may each be operatively coupled to network 130 using respective network links. The links coupling computing devices 110 and application service provider system 170 to network 130 may be Ethernet or other types of network connections and such connections may be wireless and/or wired connections.

Application service provider system 170 represents any suitable remote computing systems, such as one or more desktop computers, laptop computers, mainframes, servers, cloud computing systems, etc. capable of sending information to and receiving information from computing devices 110 via a network, such as network 130. Application service provider system 170 hosts (or at least provides access to) information associated with one or more application executable by computing devices 110, such as respective state information for the one or more applications. In some examples, application service provider system 170 represents a cloud computing system that provide the application services via the cloud.

Each of computing devices 110 represents a respective individual mobile or non-mobile computing device. Examples of computing devices 110 include mobile phones, tablet computers, laptop computers, desktop computers, servers, mainframes, set-top boxes, televisions, wearable devices (e.g., computerized watches, computerized eyewear, computerized gloves, etc.), home automation devices or systems (e.g., intelligent thermostats or home assistant devices), personal digital assistants (PDAs), gaming systems, media players, e-book readers, mobile television platforms, automobile navigation or infotainment systems, or any other type of mobile, non-mobile, wearable, and non-wearable computing devices configured to send and receive information via a network, such as network 130.

Computing devices 110 include user interface devices (UID) 112A-112N (collectively, "UIDs 112", user interface (UI) modules 120A-120N (collectively, "UIs 120"), unique identifier module 122A-122N (collectively, "unique identifier modules 122"), and applications 124A-124N (collectively, "applications 124"). While shown as distinct modules, in some examples, the functionality of unique identifier modules 122 may be included in applications 124, one example of which is described below with respect to FIG. 2. Modules 120 and 122 may perform operations described using software, hardware, firmware, or a mixture of hardware, software, and firmware residing in and/or executing at respective computing devices 110. Computing devices 110 may execute modules 120 and 122 with multiple processors or multiple devices. Computing devices 110 may execute modules 120 and 122 as virtual machines executing on underlying hardware. Modules 120 and 122 may execute as one or more services of an operating system or computing platform. Modules 120 and 122 may execute as one or more executable programs at an application layer of a computing platform.

UIDs 112 of computing devices 110 may function as input and/or output devices for computing devices 110 and may be implemented using various technologies that enables computing devices 110 to provide a user interface. For instance, each of UIDs 112 may function as an input device using microphone technologies, infrared sensor technologies, presence-sensitive input screens, touchscreens, pressure sensitive screens, or other input device technology for use in receiving user input. Each of UIDs 112 may function as an output (e.g., display) device using any one or more display devices, speaker technologies, haptic feedback technologies, or other output device technology for use in outputting information to a user. In the example of FIG. 1, UIDs 112 may display a user interface, including application graphical user interfaces generated by one or more applications 124 or other modules, components, applications, and/or services executing at or accessible from computing devices 110.

Each of UI modules 120 may manage user interactions with respective UIDs 112 and other input and output components of computing devices 110 as the interactions relate to the user interface(s) provided by computing devices 110. For example, one or more UI modules 120 may send commands and/or instructions to respective UIDs 112 that cause the respective UIDs 112 to output a user interface for display. Each of UI modules 120 may receive one or more indications of input (e.g., touch data, voice data, etc.) detected by corresponding UIDs 112 as a user interacts with the user interface. UI modules 120 may send updated instructions and commands to UIDs 112 in response to the indications of input that cause UIDs 112 to modify the presentation of the user interface. UI modules 120 may interpret the indications of input detected by UIDs 112 and relay information about the inputs to other components of computing devices 110 (e.g., opaque identifier modules 122, other modules of computing devices 110, applications 124 executing at computing devices 110, and/or services executing at, or accessible to, computing devices 110). UI modules 120 may send updated instructions and commands to UIDs 112 based on other information UI modules 120 receives from the other components, to cause UIDs 112 to further modify the presentation of the user interface.

In accordance with techniques of this disclosure, a user of computing device 110A may provide user input to execute an application (e.g., application 124Aa). The user input may include a touch input, a voice input, a keyboard input, a mouse, trackpad, or other pointing device input, etc. The user input may be a selection of an application icon, a link, or other graphical or textual object that is associated with particular functionality of an application (e.g., a default or "home" screen of the application, navigation instruction functionality, mapping functionality, restaurant listing functionality, nearby store functionality, telephony functionality, social network functionality, or any other functionality provided by the application).

In response to receiving the user input to execute application 124Aa, opaque identifier module 122A may determine the current user of computing device 110A and may determine a reset state of application 124Aa. The current user of computing device 110A is the user associated with a user account that is currently logged in at computing device 110A. In some example, such as if a guest account is the currently logged in account, computing device 110A may determine that a different user is the current user of computing device 110A by, for example, by applying facial recognition to an image captured by a front camera of computing device 110A. The reset state of application 124Aa may be any value that changes each time a user of computing device 110A request that the state of application 124Aa is reset, but is otherwise a static value across different execution instances of application 124Aa. For example, the reset state of application 124Aa may initially be the value 1. The user may cause computing device 110A to execute application 124Aa several times, but the reset state remains at the value 1. However, if the user provides a user input to reset the state of application 124Aa, opaque identifier module 122A may increment or otherwise change the value of the reset state, e.g., to the value 2.

Using information about the current user of computing device 110A, the value of the reset state, an application identifier for application 124Aa, opaque identifier module 122A generates a unique identifier that does not include personally identifiable information for the current user of computing device 110A. That is, opaque identifier module 122A uses a tuple of information to generate an identifier that uniquely identifies the current user and application 124Aa, but does not include any information that would enable application service provider system 170 to determine the personal identity of the current user of computing device 110A. Opaque identifier module 122A may provide the unique identifier to application 124Aa or may send the unique identifier to application service provider system 170. In some examples, application 124Aa may send the unique identifier to application service provider system 170. Regardless of whether opaque identifier module 122A or application 124Aa sends the unique identifier to application service provider system 170, the element that sends the unique identifier may also send information about application 124Aa, such as an application identifier such that application service provider system 170 may identify the particular application associated with the unique identifier. In some examples, during execution of application 124Aa, application 124Aa may send one or more requests for information (e.g., state information including user preference information, information about a current state of the application, usage history information, etc.).

Application service provider system 170 receives, via network 130, the unique identifier (i.e., that uniquely identifies the current user of computing device 110A and does not include personally identifying information) and one or more requests for information and/or one or more application requests from computing device 110A. The one or more requests for information may include request for user preference information, usage information, a current state of application 124Aa as maintained by application service provider system 170, or any other information. In various instances the one or more requests for information may include requests for the application to provide certain information associated with particular functionality of application 124Aa, such as navigation instructions, search results, or any other data.

In general, application service provider system 170 maintains state information for one or more applications 124, including, in this example, application 124Aa. The state information may include application usage information, user preference information, and information about a current state of the application. Typically, state information module 172 of application service provide system 170 maintains the state information by associating the state information with the unique identifier such that, if the same user using the same application requests information from application service provider system 170, state information module 172 retrieves the information using the unique identifier. Rather than using a unique identifier that includes personally identifiable information, state information module 172 uses the unique identifier generated by opaque identifier module 122A, which does not include personally identifiable information. However, state information module 172 uses the unique identifier from computing device 110A in substantially the same manner as a different unique identifier that may include personally identifiable information. That is, techniques of this disclosure may increase the protection of personally identifiable information for the current user of computing device 110A without requiring modification to application service provider system 170.

State information module 172 updates, based on the received requests for information and the unique identifier, the state information for application 124Aa. For example, state information module 172 may update historical request information associate with the unique identifier, which may include user preference information associate with the unique identifier. That is, state information module 172 may determine that the one or more requests include user preference information for application 124Aa and may update the historical request information to include the user preference information specified in the one or more requests. The historical request information includes the state information for application 124Aa. For example, the historical request information may include application usage information, information for the current state of the application, user preference information, etc.

State information module 172, in response to receiving the one or more application requests, may update the state information for application 124Aa maintained by application service provider system 170 and may send at least a portion of the state information to computing device 110A. Computing device 110A may update the current state of application 124Aa based on the received state information.

In some examples, the user identified as the current user of computing device 110A may switch devices, use computing device 110N, and cause computing device 110N to execute a different installation instance of the same application (e.g., application 124Na where application 124Na is the same as application 124Aa, but installed at computing device 110N instead of computing device 110A—different instances of a single application). In such examples, opaque identifier module 122N generates another unique identifier using information about the current user of computing device 110N, the reset state of application 124Na, and an application identifier for application 124Na. In instances where the current user of computing device 110N is the same as the current user of 110A at the time opaque identifier module 122A generated the unique identifier, application 124An is the same as application 124Aa, and where the reset state of application 124An is the same as the reset state of application 124Aa, opaque identifier module 122N generates a unique identifier that has the same value as the unique identifier generated by opaque identifier module 122A.

Computing device 110N sends the unique identifier generated by opaque identifier module 122N to application service provider system 170, which receives the unique identifier. State information module 172 determines, based on the unique identifier, user preference information included in the historical request information that is maintained by state information module 172 and associated with the unique identifier. Application service provider system 170 sends the user preference information to computing device 110N. Responsive to receiving the user preference information, computing device 110N may configure, based on the user preference information, application 124Na Techniques of this disclosure also provide a mechanism by which a user may reset the state of each of applications 124, thereby effectively appearing as a new user to application service provider system 170. For example, if a user of computing device 110A chooses to reset the state of application 124Aa, opaque identifier module 122A may update the reset state of application 124Aa by, for example, changing the value of the reset state associated with application 124Aa. As opaque identifier module 122A generates the unique identifier for application 124Aa using a combination of a user identifier for the current user of computing device 110A, an application identifier for application 124Aa, and the reset state, changing the value of the reset state, even though the user and application identifiers stay the same, results in a different value for the unique identifier. Because the unique identifier has a different value, state information module 172 has no state information for that particular unique identifier, thus the user of computing device 110A appears to application service provider system 170 as a new user. That is, state information module 172, in response to receiving the unique identifier having the different value, determines different user preference information associated with the unique identifier and providers the different user preference information to computing device 110A.

In some examples, computing devices 110 may be configured to synchronize the application reset states across all computing devices associated with a particular user. For example, if computing device 110A and 110N are associated with the particular user, in response to receiving user input to reset the state of application 124Aa, opaque identifier module 122A may cause computing device 110A to send, via network 130, a command to update the reset state of a different instances of the single application installed at computing device 110N (e.g., application 124Na). The command to update the reset state may include the updated value for the reset state for application 124Aa at computing device 110A. Responsive to receiving the command to update the reset state, opaque identifier module 122N may update the reset state for application 124Na by, for example, setting the reset state for application 124Na to the same value as the reset state for application 124Aa. In this way, techniques of this disclosure may enable a user to provide a single input at a computing device and reset the state information for an application across all computing devices associated with the user without requiring the user to create a new user account or uninstall and reinstall the application.

Figure 2:
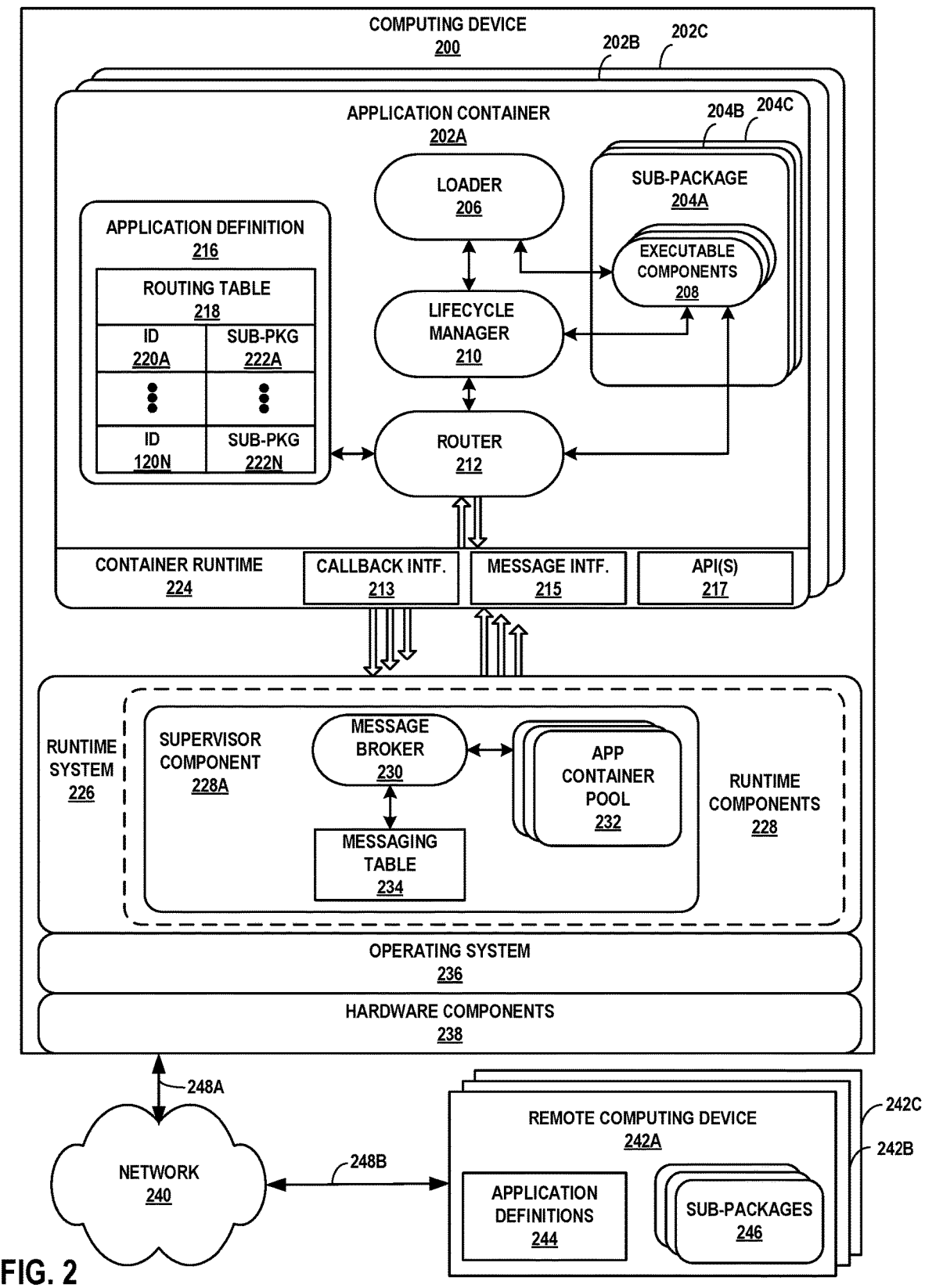
FIG. 2 is a conceptual diagram illustrating an example computing device that provides identifiers across application instances for ephemeral applications, in accordance with techniques of this disclosure.

FIG. 2 is a conceptual diagram illustrating an example computing device 200 that provides identifiers across application instances for ephemeral applications, in accordance with techniques of this disclosure. Ephemeral applications include applications that appear to be fully installed and available to a user of the computing device, but may not have any application code for the application installed at the computing device or may have application code for a portion of the full functionality of the application installed at the computing device. Instead, the application code for requested functionality of the application may be installed in response to receiving user input to utilize the requested functionality of the application. Further, the computing device may periodically uninstall portions of the application code of the application, such as for application code for functionality of the application that has not been requested by the user within some threshold period of time. Thus, ephemeral applications may appear to be conventional applications to an end user even though the application code for some or all the functionality provided by the application may not be installed at the computing device at any given time and may be removed from the computing device without user input. Techniques of this disclosure provide a mechanism by which application state information that may otherwise be lose when the ephemeral applications are uninstalled without user actions may be maintained across application installations.

Examples of computing device 200 may include, but are not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 200 may include stationary computing devices such as desktop computers, servers, mainframes, etc.

As shown in FIG. 2, computing device 200 includes application containers 202, system runtime 226, operating system 236, and hardware components 238. Computing device 200 may communicate with one or more other remote computing devices 242A-242C ("remote computing devices 242") via network 240 and communication links 248A-248B. As shown in FIG. 2, network 240 represents any public or private communication network, for instance, a cellular, Wi-Fi, and/or other type of network for transmitting data between computing devices. Computing device 200 and remote computing devices 242 may send and receive data across network 240 using any suitable communication techniques. For example, computing device 200 may be operatively coupled to network 240 using communication link 248A. Remote computing device 242A may be operatively coupled to network 240 by communication link 248B. Network 240 may include network hubs, network switches, network routers, etc., that are operatively inter-coupled thereby providing for the exchange of information between computing device 202 and remote computing devices 242. In some examples, communication links 238A-238B may be Ethernet, ATM or other network connections. Such connections may be wireless and/or wired connections.

Hardware components 238 may include but are not limited to computer processors, communication units (e.g., modems, network interface controllers, and the like), input components, output components, a presence-sensitive display, volatile and non-volatile memories, and a power source to name only a few examples. Operating system 236 may execute on hardware components 238 and manage hardware and software components of computing device 200. For instance, operating system 236 may perform memory management, process scheduling and non-volatile storage management. Operating system 236 may also provide network and security services to applications executing at computing device 200. Operating system 236 may also perform more or fewer functions than described above.

Runtime system 226 implements an execution model for applications that are built according to a particular programming language in which the applications are written and built or compiled. Runtime system 226 may include one or more libraries and/or services that are accessible to application containers 202 during execution. As further described in this disclosure, each of application containers 202 may correspond to a distinct application. Runtime system 226 may include thread-management services, screen drawing and user-interface rendering component, and inter- and intra-application messaging services to name only a few example services. Application containers 202 may access the services through Application Programming Interfaces (APIs) that are exposed by runtime components 228. In some examples, runtime system 226 may be executed as one or more processes and/or threads. One or more of the processes and/or threads may execute with or without operating system privileges.

As shown in FIG. 2, runtime system 226 may include runtime components 228. Each distinct runtime component may be implemented with one or more processes and/or threads. In some examples, each distinct runtime component may provide a user-defined set of functionality. For instance, a user-interface rendering component may be implemented with one or more libraries that define user-interface elements (e.g., buttons, lists, images, input fields, and the like) and their corresponding behaviors. The user-interface rendering component may provide APIs, which are called by application containers 202 to render the user-interface elements in a graphical user interface.

Supervisor component 228A is included in runtime components 228. Supervisor component 228A performs installation and maintenance of application containers 202 and provides inter- and intra-application messaging services. Supervisor component 228A includes a message broker 230 that listens for messages generated by application containers 202 and performs actions for the sending application container or one or more other application containers. Supervisor component 228A may have first priority or the first opportunity at dispatching any message (e.g., a message containing a URI as a user-specified identifier). In some examples, message broker 230 may provide additional processing for messages, such as allocating application containers from application container pool 232, enforcing security for messages, and logging messages, to name only a few examples. As an example, application container 202A may generate a message to navigate from a first user interface to a second user interface within the same application. Application container 202A may send the message to message broker 230, which includes a messaging table 234 comprising a set of filters, where each filter has one or more conditions and one or more corresponding actions. If the content of the message matches a condition of a filter, message broker 230 may execute the corresponding action, such as executing instructions to output the second graphical user interface. In some examples, such messages described above may be routed internally by router 212 without forwarding the messages to message broker 230.

In some examples, supervisor component 228A ensures that at least one application container is included in application container pool 232 and ready to be woken up. Each application container included in application container pool 232 are not currently allocated to a particular application and are not currently executing application code. However, each application container included in application container pool 232 includes enough bootstrapping code to be able to load and run application code when supervisor component 228A wake up the particular application container and assigns the particular application container to a particular application. The particular application container from application container pool 232 receives instructions from supervisor component 228A to begin loading and running the application code for the particular application.

As described above, each of application containers 202 may correspond to a distinct application at the time the corresponding application is executing. In various instances, supervisor component 228A maintains a mapping of which application containers are mapped to which executing applications. Applications may include distinct functionality to perform operations on computing device 200. For instance, applications may include an email application, text messing application, instant messaging application, weather application, video conferencing application, social networking application, weather application, stock market application, emergency alert application, sports application, office productivity application, multimedia player, to name only a few examples.

As a user or operating system invokes particular applications, supervisor component 228A dynamically allocates application containers 202 from application container pool 232 and maintains a mapping of the particular application containers 202 to the corresponding applications. When an application is terminated, supervisor component 228A may clean up any application containers 202 that are no longer needed. For example, supervisor component 228A may reset a state of application container 202A or may uninstall application container 202A that was mapped to a now terminated application. In examples where supervisor component 228A uninstalls application containers 202 that are no longer mapped to an actively executing application, supervisor component 228A may install new applications containers and add them to application container pool 232 to ensure that at least one application container is ready to be woken up in response to invocation of an application. In this way, the user-interactive latency of application installation may be reduced to zero or nearly zero while, from the operating system perspective, maintaining separate identities for each application.

As shown in FIG. 2, application container 202A provides an execution environment and supporting services to direct the execution of executable components 208 of an application. Application containers 202 may execute as separate processes in operating system 236. In some examples, application container 202A includes a messaging interface 215. Router 212 may receive messages from runtime system 226 via messaging interface 215, and runtime system 226 may receive messages from executable components 208 and router 212 via messaging interface 215. Program logic for application container 202A may be implemented in executable components 208. An executable component may be a logical grouping of machine-executable code. For instance, in object-oriented design, a single executable component may be a single, compiled class file that includes machine-executable code.

Application container 202A may be a vessel for one or more sub-packages 204. In some examples, a sub-package includes two or more executable components 208. A sub-package may include resources (e.g., images, text, videos or any other non-compiled data), security and/or signing information, version information and/or dependency information, or any other information for an application. A software developer may design an application to be comprised of multiple, user-defined sub-packages. Each user-defined sub-package may include set of executable components that collectively provide a discrete set of functionality. For instance, a software developer may design a navigation application with multiple different user interfaces. Each user interface may include a different set of user interface elements and corresponding behaviors. As such each user interface may be implemented with a distinct set of executable components. For instance, the navigation application may include a turn-by-turn navigation user interface, a point-of-interest user interface (e.g., displaying details for a point of interest on a map), and a settings user interface. The software developer may design the application with three different sub-packages, where each sub-package includes a set of executable components to implement the functionality for the respective user interface.

Application container 202A may include container runtime 224. Container runtime 224 may include one or more libraries and/or one or more Application Programming Interfaces (APIs) 217 to services and/or functions that are provided by libraries within container runtime 224, runtime system 226, and/or operating system 236. As such, container runtime 224 may provide a secure in-process API layer. That is, each application container 202 shares a process and address space with the application code for the particular application to which the application container is mapped. By sharing the process and address space, application container 202 may simplify method call semantics between application code and shared API code. That is, rather than requiring a developer to use blocking interprocess communication calls, the developer may directly utilize APIs 217.

By controlling the application container and container runtime, runtime system 226 can proxy API calls and verify that application container and container runtime have not been tampered with and therefore provide runtime logic for sensitive behavior. For instance, an application that requests access a user's device identifier (e.g., a globally unique identifier of the device) could be required to call through APIs of the container runtime, which could then check with supervisor component 228A to ensure this is allowed behavior or even to modify the output of that API (by, for example scrubbing or pseudonymizing personally identifying information). In general, application containers 202 may permit some direct access to operating system 236, may permit some indirect action via the proxying, and may also block access to certain APIs. In this way, container runtime 224 may enforce a guarantee that such checks occur various operations because such operations could only be made through APIs of container runtime 224. Further, because container runtime 224 of application containers 202 provide APIs 217, updates to application containers 202 may be performed an application update rather than requiring an update to the underlying operating system 236, which may increase the adoption rate of any such updates, which may, in turn, increase security of the operating platform.

Container runtime 224 may also provide a layer to iterate on APIs that require platform coordination. For instance, sub-package could declare that it requires some particular data, such as location, and container runtime 224 could obtain the location in parallel with loading executable components for a particular sub-package and provide the location as an argument on startup of an application. As one example, a developer may specify, in metadata for an application, that some dependent data is required for execution of the application. Container runtime 224 may not only retrieve and begin executing the application code for the application, but may also, in parallel, identify and retrieve the dependent data. In some instances, the developer may specify whether the dependent data is mandatory (i.e., required for the application to execute) or "best effort" (i.e., improves operation/functionality of the application, but not strictly required for the application to execute). An example of mandatory dependent data may be data that is required to display a basic user interface for the application. For "best effort" dependent data, container runtime 224 may begin executing the application code as soon as the application code is downloaded and available to execute, even if container runtime 224 has not yet received the "best effort" dependent data.

Each application may be executed with an application container that includes one or more executable components that define the operations of the application. Application container 202A includes a router 212 that sends and receives messages, which change the behavior of the application and/or cause the application to perform one or more operations, with executable components 208 and messaging interface 215. For instance, router 212 may receive a message that requests the execution of one or more operations. Router 212 may determine, based on the contents of the message, whether a sub-package that includes executable components to perform the one or more operations are stored locally or are otherwise accessible on computing device 200. The contents of the message may include an identifier such as a Uniform Resource Identifier (URI) that corresponds to the sub-package. If the sub-package is stored locally or is otherwise accessible on computing device 200, then router 212 identifies one or more executable components to perform the operations based on contents of the message. In some examples, the message may include additional attributes (e.g., category for launching user interface, MIME type of data, explicit component class for execution) or data (e.g., user data or machine generated data) that further specify the one or more operations to perform. As such, the one or more executable components identified by router 212 may perform the one or more operations based on the additional attributes or data.

As described above, all of the sub-packages for a particular application need not be locally resident at computing device 200 to execute the application. To determine whether a sub-package for specific functionality is resident or otherwise accessible at computing device 200, router 212 may perform a lookup on application definition 216. Application definition 216, generally, may define mappings between user-specified identifiers (e.g., URIs, strings, integers, or any other suitable identifier) and sub-packages that specify specific functionality for the application. Application definition 216 includes these mappings in routing table 218, which includes mappings between user-specified identifiers 220A-220N ("user-specified identifiers 220") and sub-package identifiers 222A-222N ("sub-package identifiers 222"). If router 212 receives a message with a user-specified identifier to perform functionality using a particular sub-package, router 212 may perform a lookup in router table 218. If router 212 determines that user-specified identifier 220A, for example, matches the user-specified identifier in the message, router 212 may determine whether sub-package 204A that corresponds to sub-package identifier 222A is resident on computing device 200. Since sub-package 204A is resident on computing device 200, router 212 executes a call to sub-package 204A based on the message or sends the message to sub-package 204A, which performs one or more operations using executable components 208A.

As described above, because the entire set of sub-packages for an application need not be stored locally on computing device 200, the initial installation and/or initial execution of an application at computing device 200 may require less time than if the entire application needed to be downloaded from a remote computing device, installed, and executed by computing device 200. As such, a user may experience greater responsiveness from the application and/or performance for the behavior of the application.

In the example of FIG. 2, a user may desire to initially install and execute a navigation application. Initially, none of the sub-packages or the application definition for the navigation application may be stored at computing device 200. The user may provide a user input to computing device 200 to initially select an icon in a user interface provided by operating system 236 that corresponds to the map application. Alternatively, the user may select the map application in a media store application (not shown) that executes at computing device 200 and communicates with remote computing devices 242 to retrieve sub-packages and application definitions. In any case, message broker 230 of supervisor component 228A receives a message from operating system 236 or the media store application that requests execution of particular functionality for the navigation application. Because the navigation application is not yet installed, the particular functionality requested is to display the default or main user interface for the application.

Supervisor component 228A may determine whether an application container has already been allocated in the memory of computing device 200 for the navigation application based on the content of the message. For instance, the content of the message may include a unique identifier of the navigation application, such as name for the application. In response to determining that supervisor component 228A has not yet allocated an application container for the navigation application, supervisor component 228A may allocate an application container 202A from application container pool 232. Application container pool 232 may include a set of processes that are reserved for and usable to execute applications. In some examples, supervisor component 228A may communicate with operating system 236 to create a new process for application container 202A.

Supervisor component 228A may determine that the navigation application is not yet installed and request an application definition from one or more of remote computing devices 242. For instance, supervisor component 228A may send a message to remote computing device 242A, where the message includes an identifier for the navigation application that is globally unique in remote computing devices 242. Remote computing device 242A, upon receiving the message, selects application definition 216 from application definitions 244, and sends application definition 216 to computing device 200. Supervisor component 228A receives application definition 216, which may be included in or accessible to application container 202A.

Supervisor component 228A causes message broker 230 to send a message to application container 202A to display the default or main user interface for the application. In particular, the message may include a user-specified identifier that corresponds to a sub-package with functionality to display the default or main user interface for the application. In some examples, message broker 230 receives (or generates) the user-specified identifier based on information received from the media store application, or from bootstrapping functionality associated with the icon for the mapping application that was initially selected by the user. The bootstrapping functionality may include, but is not limited to, sending the user-specified identifier to message broker 230.

Router 212 receives the message with the user-specified identifier via messaging interface 215. In this example of FIG. 2, the user-specified identifier is 220A. Based on the user-specified identifier, router 212 determines that the sub-package for sub-package identifier 222A corresponding to user-specified identifier 220A is not stored locally at computing device 200. Router 212 may send a message, using container runtime 224 and/or runtime system 226, to remote computing device 242A to request the sub-package for sub-package identifier 222A. For instance, the message sent by container runtime 224 and/or runtime system 226 to remote computing device 242A may include sub-package identifier 222A. Remote computing device 242A may send a sub-package to computing device 200 comprising executable components for displaying the default or main user interface of the navigation application.

Router 212, in response to determining that the sub-package for sub-package identifier 222A is not stored locally, may cause lifecycle manager 210 to listen for system lifecycles calls via callback interface 213, where the lifecycle calls are issued by runtime system 226. Lifecycle calls may include starting an application, pausing an application, restarting an application, or terminating an application, to name only a few examples. Lifecycle manager 210 may buffer the lifecycle calls, which will be executed by the executable components of sub-package 204A, once computing device 200 has retrieved sub-package 204A from remote computing device 242A. Once sub-package 204A has been retrieved by computing device 200, lifecycle manager 210 may send each of the buffered lifecycle calls to sub-package 204A.

In the example of FIG. 2, in response to lifecycle manager 210 determining that computing device 200 has retrieved and stored sub-package 204A locally, lifecycle manager 210 sends a call or otherwise invokes loader 206 to load one or more of executable components 208 into memory of computing device 200 in order to execute the particular functionality initially requested, e.g., display the default or main user interface for the application. In some examples, loader 206 is responsible for loading executable components into memory. In some examples, loader 206 may represent multiple loaders, where each loader is responsible for loading a different executable component into memory. Loader 206 may, for a particular executable component, locate corresponding libraries used by the particular executable component and load any such libraries into memory, such that the libraries are accessible to the particular executable component. Lifecycle manager 210 may also send the buffered lifecycle calls to one or more of executable components 208. Upon receiving the buffered lifecycle calls, the one or more of executable components 208 cause computing device 200 to display the default or main user interface for the application.

At a later time, if the user wishes to navigate to a settings user interface, the user may provide a user input that selects a user interface element (e.g., icon, button, label, or the like) for the settings in the currently displayed default or main user interface for the application. Runtime system 226 sends a message to application container 202A that indicates the selection of the user interface element. Executable component 208A determines that the selection displays the settings user interface. Executable component 208A generates a message with a user-specified identifier 220N for sub-package 222N that includes the functionality for the settings user interface. Executable component 208A may send the message to router 212 directly, or to runtime system 226, which in turn routes the message back to router 212. In either case, router 212 performs a lookup of user-specified identifier 220N and determines that the sub-package for sub-package identifier 222N is not locally stored at computing device 200.

In a similar manner, as described above with respect to sub-package 204A, router 212 sends a message, using container runtime 224 and/or runtime system 226, to remote computing device 242A to retrieve the sub-package for sub-package identifier 222N. Remote computing device 242A may send sub-package 222N to computing device 200 comprising executable components for displaying the settings interface of the navigation application. While computing device 200 is retrieving sub-package 222N, lifecycle manager 210 may buffer lifecycle calls received at callback interface 213. Upon downloading sub-package 222N, lifecycle manager 210 causes loader 206 to load executable components of sub-package 222N into memory. Loader 206 may initiate execution of one or more of the executable components to cause the settings interface of the navigation application to be displayed at a display device of computing device 200.

In various instances, supervisor component 228A may uninstall one or more sub-packages 204 from application container 202A. For example, supervisor component 228A may determine that computing device 200 is running low on available storage space or that a use of computing device 200 has not requested functionality of one or more sub-packages 204 within a threshold amount of time and, in response, determine to remove one or more sub-packages 204 form application container 202A. In some instances, supervisor component 228A may completely uninstall or deallocate application container 202A, which may remove all of sub-packages 204 from computing device 200. However, even after removing all sub-packages 204 and deallocating or uninstalling application container 202A, the application may still appear, to a user of computing device 200, to be installed at computing device 200. For example, an icon or other graphical element for the application may still appear within a graphical user interface of computing device 200 (e.g., on a desktop GUI) or an indication of the application may appear in a list of applications installed at computing device 200. Even though sub-packages 204 and application container 202A may no longer be stored at computing device 200, various state information for the application may be maintained by supervisor component, including an application identifier for the application and reset state information for the application.

If, after the application has been uninstalled from computing device 200, the user requests execution of the application, supervisor component 228A may allocate a new application container from application container pool 232. For example, supervisor component 228A may allocate application container 202B for the application. In various instances, application container 202B may set the state of the application to the state of the application prior to the application being uninstalled from computing device 200. For example, container runtime 224 of application container 202B may generate a unique identifier that has the same value as the unique identifier that was last generated prior to uninstalling the application, assuming that the user did not provide input to reset the state of the application between the time the last unique identifier was generated and the current time. Container runtime 224 may determine the reset state by loading the reset state stored at computing device 200 and may determine the current user of the computing device. Using the reset state, information for the current user of the computing device, and an application identifier for the application, container runtime 224 generates the unique identifier that does not include personally identifiable information for the current user.

Computing device 200 sends the unique identifier and one or more requests for information to an application service provider system, such as one of remote computing devices 242 or application service provider system 170 of FIG. 1. The application servicer provider system retrieves the requested information, which may include state information for the application including a current state of the application and user preference information, and sends the requested information to computing device 200. Container runtime 224 updates the current state of the application based on the received state information. In this way, techniques of this disclosure may enable state information to be maintained for ephemeral applications without providing personally identifiable information to an application service provider.

In some examples, a user may own multiple devices and may execute the navigation application across each of the user's devices. However, the user may not want to register for a user account for the navigation application and would rather remain anonymous to the navigation application developer. In some examples, application container 202A may provide a multi-device, pseudonymous, privacy-friendly identifier to the navigation application and associated service that may be to retain state information across the user's devices (e.g., search history, preferences, etc.). Each application installed by a user on one or more devices may be assigned an opaque identifier that is unique for the tuple of (user, application, reset sequence). Rather than providing personally identifying information to the application service provider, the application service provider receives the opaque identifier.

For example, if a user launches the navigation application on her phone for the first time. Supervisor component 228A may automatically provide an ID that is unique for the user, such as a hash of the tuple (user1, navapp, 1) and provide it to application container 202A, which is mapped to the navigation application, at startup. If the user indicates that a particular location corresponds to the user's home, the navigation application may store this search history against the unique identifier on the application service provided by the navigation application developer. Later, if the user launches the navigation application on her tablet, the supervisor component executing on the tablet may generate the same unique identifier for the user, i.e., by hashing the same tuple (user1, navapp, 1). By generating the same unique identifier for the user, the navigation application may show the location of her home within the navigation application.

Later, if the user would like to reset the save state information, the user may reset his/her relationship with the navigation application (e.g., via a settings user interface of the navigation application). On the next invocation of the navigation application, application container 202A may provide a new unique identifier to the navigation application. As one example, container runtime 224 may increment the reset state portion of the tuple, which would result in a different tuple (user1, navapp, 2) that, when hashed, would generate a different unique identifier. By changing the unique identifier, the navigation application is unable to load the state information associated with the previous unique identifier. Thus, if the user indicates a different location as being the user's home, the new location is associated with the new unique identifier without any knowledge of the previous location associated with the user's home. That is, techniques of this disclosure may enable an application to maintain state information across different devices such that a user may have a consistent experience without requiring the user to provide his/her personally identifying information.

In various instances, the navigation application may need the user's personally identifiable information. For example, if the user searches for a restaurant using the navigation application, the navigation application may offer an option to make a reservation at the restaurant. If the user chooses to use the navigation application to make a reservation, the navigation application may request the user's name and other personally identifiable information in order to complete the reservation request. If the user provides the information to the navigation application, the navigation application may associate the user's information with the unique identifier. However, the user may easily reset the state information and generate a new unique identifier.

In some instances, an intermediary service provider may maintain state information associated with the unique identifier without requiring the application developer to operate such a service. The intermediary service provide may ensure that all previous state stored under the current identifier is present on the device before running the application. In instances where the intermediary servicer provider stores both personally identifying information for the user and the unique identifier, the intermediary service provider may service particular requests without the user revealing his/her identity to the application. For example, the intermediary service provider may be able to complete payments that may be performed anonymously with no extra sign-in or account selection step. As another example, the intermediary service provider may manage re-engagement via email and push notifications. The developer may address the user using the unique identifier and the intermediary service provider may enforce anti-spam controls in a single, easy-to-understand place for the user, ultimately exchanging the unique identifier for the real one without the information leaking to the developer.

Figure 3:
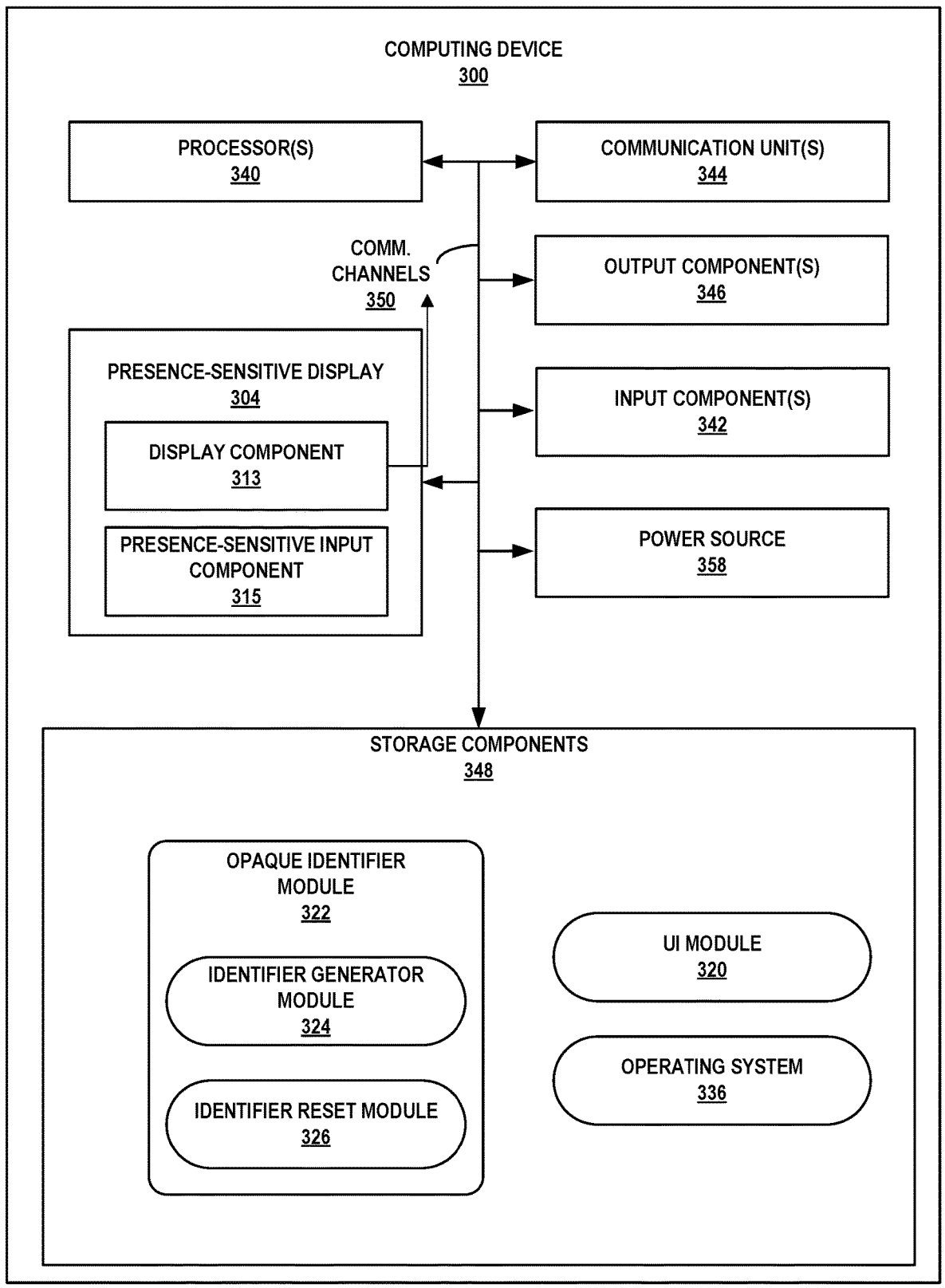
FIG. 3 is a block diagram illustrating further details of a computing device, in accordance with one or more aspects of the present disclosure.

FIG. 3 is a block diagram illustrating further details of computing devices 100 and/or 200, in accordance with one or more aspects of the present disclosure. FIG. 3 illustrates only one particular example of computing devices 100 and/or 200. Many other examples of computing devices 100 and/or 200 may be used in other instances and may include a subset of the components included in example computing device 300 or may include additional components not shown example computing device 300 in FIG. 3.

As shown in the example of FIG. 3, computing device 300 includes one or more processors 340, one or more input components 342, one or more communication units 344, one or more output components 346, one or more storage devices 348, and presence-sensitive display 312. Storage devices 348 of computing device 300 include opaque identifier module 322, UI module 320, and operating system 336. Communication channels 350 may interconnect each of the components 340, 344, 346, 342, 358, 304, 313, 315, 348, 320, 322, 324, 326, and/or 336 for inter-component communications (physically, communicatively, and/or operatively). In some examples, communication channels 350 may include a system bus, a network connection, one or more inter-process communication data structures, or any other components for communicating data between hardware and/or software.

One or more processors 340 may implement functionality and/or execute instructions within computing device 300. For example, processors 340 on computing device 300 may receive and execute instructions stored by storage devices 348 that provide the functionality of operating system 336, opaque identifier module 322, and UI module 320. These instructions executed by processors 340 may cause computing device 300 to store and/or modify information, within storage devices 348 during program execution. Processors 340 may execute instructions of operating system 336, opaque identifier module 322, and UI module 320 to perform one or more operations. That is, operating system 336, opaque identifier module 322, and UI module 320 may be operable by processors 340 to perform various functions described in this disclosure.

One or more input components 342 of computing device 300 may receive input. Examples of input are tactile, audio, kinetic, and optical input, to name only a few examples. Input components 342 of computing device 300, in one example, include a mouse, keyboard, voice responsive system, video camera, buttons, control pad, microphone or any other type of device for detecting input from a human or machine. In some examples, input component 342 may be a presence-sensitive input component, which may include a presence-sensitive screen, touch-sensitive screen, etc.

One or more output components 346 of computing device 300 may generate output. Examples of output are tactile, audio, and video output. Output components 346 of computing device 300, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, presence-sensitive display 304 of computing device 300 may include functionality of input component 342 and/or output components 346. In the example of FIG. 3, presence-sensitive display 304 may include a presence-sensitive input component 315, such as a presence-sensitive screen or touch-sensitive screen. In some examples, presence-sensitive input component 315 may detect an object at and/or near the presence-sensitive input component. As one example range, presence-sensitive input component 315 may detect an object, such as a finger or stylus that is within two inches or less of presence-sensitive input component 315. Presence-sensitive input component 315 may determine a location (e.g., an (x,y) coordinate) of the presence-sensitive input component at which the object was detected. In another example range, presence-sensitive input component 315 may detect an object two inches or less from presence-sensitive input component 315 and other ranges are also possible. Presence-sensitive input component 315 may determine the location of presence-sensitive input component 315 selected by a user's finger using capacitive, inductive, and/or optical recognition techniques.

In some examples, presence-sensitive display 304 may also provide output to a user using tactile, audio, or video stimuli as described with respect to output component 346. For instance, presence-sensitive display 304 may include display component 313 that presents a graphical user interface. Display component 313 may be any type of output component that provides visual output, such as described with respect to output components 346. While illustrated as an integrated component of computing device 300, presence-sensitive display 304 may, in some examples, be an external component that shares a data path with other components of computing device 300 for transmitting and/or receiving input and output. For instance, presence-sensitive display 304 may be a built-in component of computing device 300 located within and physically connected to the external packaging of computing device 300 (e.g., a screen on a mobile phone). In another example, presence-sensitive display 304 may be an external component of computing device 300 located outside and physically separated from the packaging of computing device 300 (e.g., a monitor, a projector, etc. that shares a wired and/or wireless data path with a tablet computer). In some examples, presence-sensitive display 304, when located outside of and physically separated from the packaging of computing device 300, may be implemented by two separate components: a presence-sensitive input component 315 for receiving input and a display component 313 for providing output.

One or more communication units 344 of computing device 300 may communicate with external devices by transmitting and/or receiving data. For example, computing device 300 may use communication units 344 to transmit and/or receive radio signals on a radio network such as a cellular radio network. In some examples, communication units 344 may transmit and/or receive satellite signals on a satellite network such as a Global Positioning System (GPS) network. Examples of communication units 344 include a network interface card (e.g. such as an Ethernet card), an optical transceiver, a radio frequency transceiver, a GPS receiver, or any other type of device that can send and/or receive information. Other examples of communication units 344 may include Bluetooth®, GPS, 3G, 4G, and Wi-Fi® radios found in mobile devices as well as Universal Serial Bus (USB) controllers and the like.

As shown in FIG. 3, computing device 300 may include a power source 358. In some examples, power source 358 may be a battery. Power source 358 may provide power to one or more components of computing device 300. Examples of power source 358 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 358 may have a limited capacity (e.g., 1000-3000 mAh).

One or more storage devices 348 within computing device 300 may store information for processing during operation of computing device 300. In some examples, storage device 348 is a temporary memory, meaning that a primary purpose of storage device 348 is not long-term storage. Storage devices 348 on computing device 300 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 348, in some examples, also include one or more computer-readable storage media. Storage devices 348 may be configured to store larger amounts of information than volatile memory. Storage devices 348 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 348 may store program instructions and/or data associated with operating system 336, opaque identifier module 322, and UI module 320. UI module 320 and operating system 336 may be examples of UI module 120s of FIG. 1 and operating system 236 of FIG. 2, respectively, and provide the functionality of UI module 120s and operating system 236 and, as described with respect to FIGS. 1 and 2.

In accordance with techniques of the disclosure, opaque identifier module 322 generates unique identifiers based on information about a current user of computing device 300, an application identifier for an application executing at computing device 300, and a reset state. Computing device 300 provides the unique identifier to an application service provider system (e.g., application system provider system 170 of FIG. 1) along with information generated by the application, such as one or more requests for information, application usage information, location information, information about a current state of the application, etc. that is maintained by the application service provider system.

Identifier generator module 324 generates the unique identifier such that the unique identifier does not include personally identifiable information. While described throughout as being generated using information for the current user of computing device 300, personally identifiable information for the current user is not included within the unique identifier. Instead, identifier generator module 324 may apply a hash function to a tuple that includes the information for the current user (such as a user identifier, e.g., email address, phone number, account number, or any other information that uniquely identifies the current user of computing device 300), the application identifier for the associated application, and the value of the reset state. In various examples, identifier generator module 324 generates the unique identifier using salt in addition to the tuple, which may make it more difficult to reverse the hash function to extract any potentially personally identifiable information that may have been used to generate the unique identifier.

Identifier reset module 326 receives state reset requests (e.g., in response to presence-sensitive display 304 detecting a user input to reset the state information for an application). In response to receiving the request to reset the state of the application, identifier reset module 326 updates the reset state for the application. For example, identifier reset module 326 updates the reset state of the application by, for example, incrementing or otherwise changing the value of the reset state. By changing the value of the reset state of the application, the unique identifier generated by identifier generator module 324 is different as the tuple used by identifier generator module 324 to generate the unique identifier is different. For example, prior to receiving the user input the reset the state information for the application, identifier generator module 324 may generate the unique identifier using the tuple (user1, app1, 1) where the last value in the tuple is the reset state. After identifier rest module 326 updates the value of the application state, identifier generator module 324 may generate the updated unique identifier using the tuple (user1, app1, 2). When computing device 300 sends the updated unique identifier to the application service provider system, the application service provider system processes the updated unique identifier as if it is a new user account as the application service provider system does not have information associated with the updated unique identifier stored at or otherwise available to the application servicer provider system. That is, after resetting the application state, the updated unique identifier causes the user to appear as a new user to application service provider system.

In some examples, identifier reset module 326 may cause computing device 300 to send a command to other computing devices associated with the current user of computing device 300 to cause the other computing devices to update the reset state for the application. The command may include an indication of the updated value of the reset state. In response to receiving the command, the other computing devices update the reset state for the application such that the updated unique identifiers generated by the other computing devices for the same user and the same application but with the updated reset state are the same as the updated unique identifier generated by identifier generator module 324 after identifier reset module 326 updates the reset state for the application at computing device 300.

Figure 4:
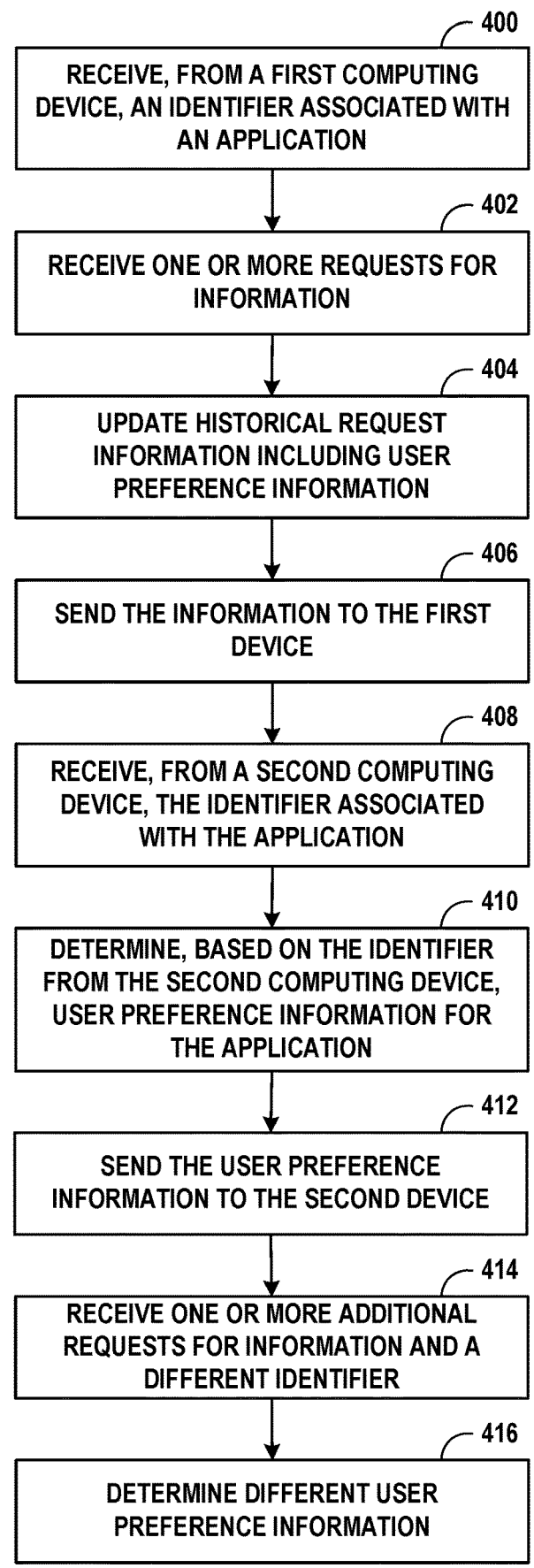
FIG. 4 is a flow chart illustrating example operations of a computing system that provides identifiers across application instances, in accordance with techniques of this disclosure.

FIG. 4 is a flow chart illustrating example operations of a computing system that provides identifiers across application instances, in accordance with techniques of this disclosure. For purposes of illustration only, the example operations are described below within the context of computing system 100 of FIG. 1. Although shown as including elements 400-416, in some examples, one or more of elements 400-416 may be optional and the actions associated with elements 400-416 may be performed in an order different from the order shown in the example of FIG. 4.

In the example of FIG. 4, application service provider system 170 receives, from a first computing device, such as computing device 110A, an identifier associated with an application executing at computing device 110A (400). For example, a user of computing device 110A may provide an input at computing device 110A to execute an application. Opaque identifier module 122A may generate the identifier associate with the application based on information about the current user, an application identifier for the application, and a reset state of the application. The identifier generated by opaque identifier module 122A does not include personally identifiable information for the current user of computing device 110A, such as user account information for the current user, a name of the current user, a phone number of the current user, an address of the current user, etc.

In some examples, when computing device 110A executes the application, computing device 110A may send one or more requests for information to applications service provider system 170 (402). The requests for information may include requests for user preference information, application usage information, and/or information about a current state of the application (e.g., when the application is executed at a different device and the user is resuming use of the application at computing device 110A). In response to receiving the requests for information, application service provider system 170 updates historical request information for the application (404), retrieves the requested information, and sends the information to computing device 110A (406). The historical request information includes state information for the application, including application usage information and user preference information. The information sent to computing device 110A may include user preference information. For example, if a user is executing the application at computing device 110A for the first time, but the user has previously executed the application at a different computing device, application service provider system 170 may send the user preference information to the application such that computing device 110A may configure the application in accordance with the user preference information.

In some examples application service provider system 170 may receive an identifier from a second computing device (408). The identifier from the second computing device does not include personally identifiable information for the current user of the second computing device and may have the same value as the identifier received from the first device when the current user of the second computing device is the same as the current user of the first computing device, the application executing at the second computing device is the same application (but a different instance of the application) executing at the first computing device, and the reset state of the application is the same on the second computing device as on the first computing device. In some examples, the second computing device may be a different computing device (e.g., computing device 110N) than the first computing device. In other examples, the second computing device is the same computing device as the first computing device, but the identifier is generated after the application is reinstalled such that the same identifier is generated and the state information may be retrieved from application service provider system 170 without requiring the user to provide personally identifying information.

In the example shown in FIG. 4, application service provides system 170 determines, based on the identifier received from the second computing device, user preference information for the application (410) and sends, to the second computing device, the user preference information (412).

The current user of the first and/or second computing devices may choose to reset the state of the application, which causes computing device to generate a different identifier for the application. Application service provider system 170 receives the different identifier (414) and processes the different identifier as if the current user is a different user. That is, because the identifier generated and sent after the user reset the state of the application is different from the previous identifier that was generated and sent by the same user, for the same application, and using the same computing device, application service provider system 170 is unable to retrieve any of the previously stored historical request information and is configured to provide application state information as if the user is a new user that has never before used the application. Thus, in response to receiving the different identifier, application service provider system 170 determines different user preference information for the application (416) and may send the different user preference information to the first and/or second computing devices.

Figure 5A:
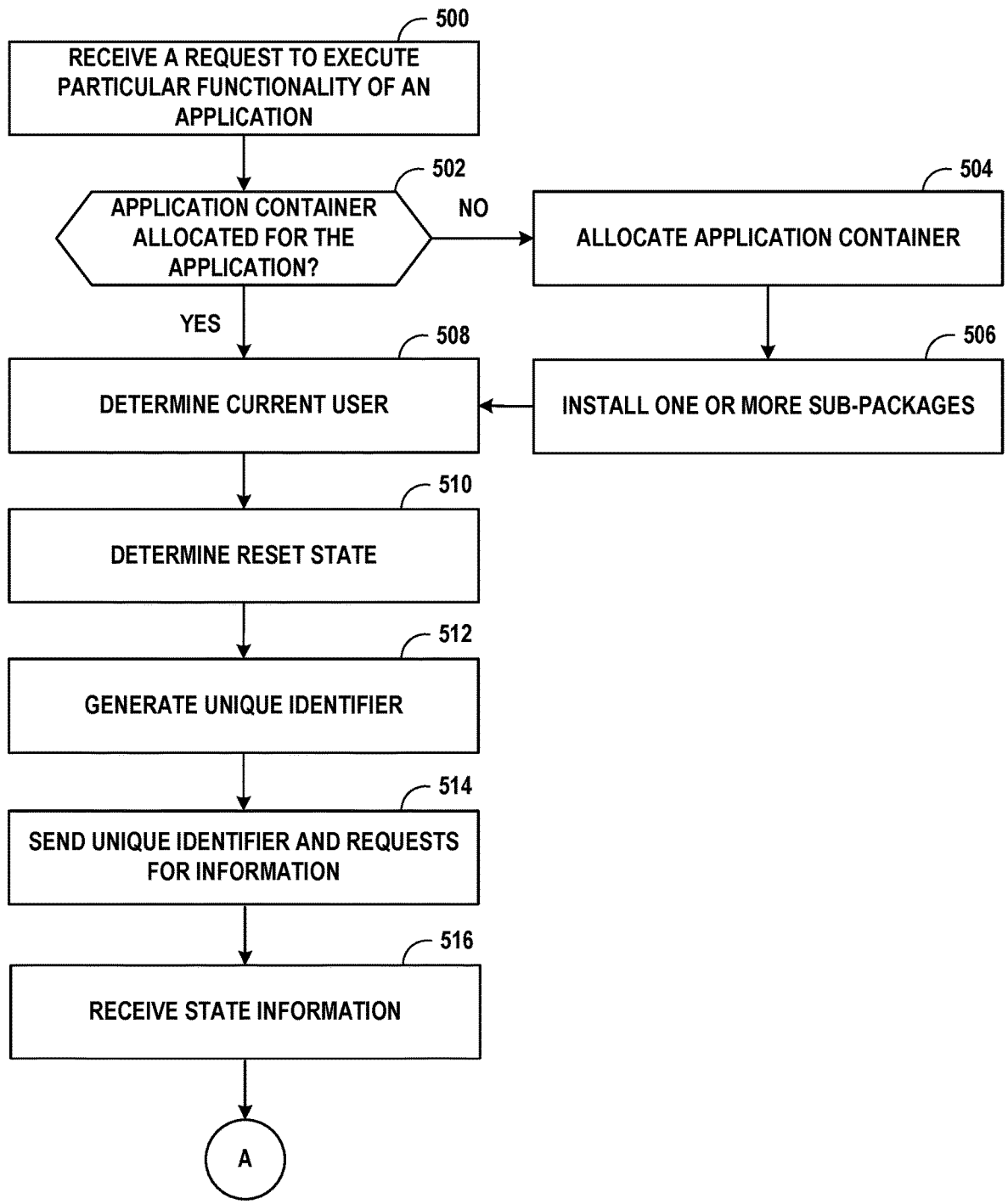
FIGS. 5A and 5B are a flow chart illustrating example operations of a computing device that provides identifiers across application instances, in accordance with techniques of this disclosure.
Figure 5B:
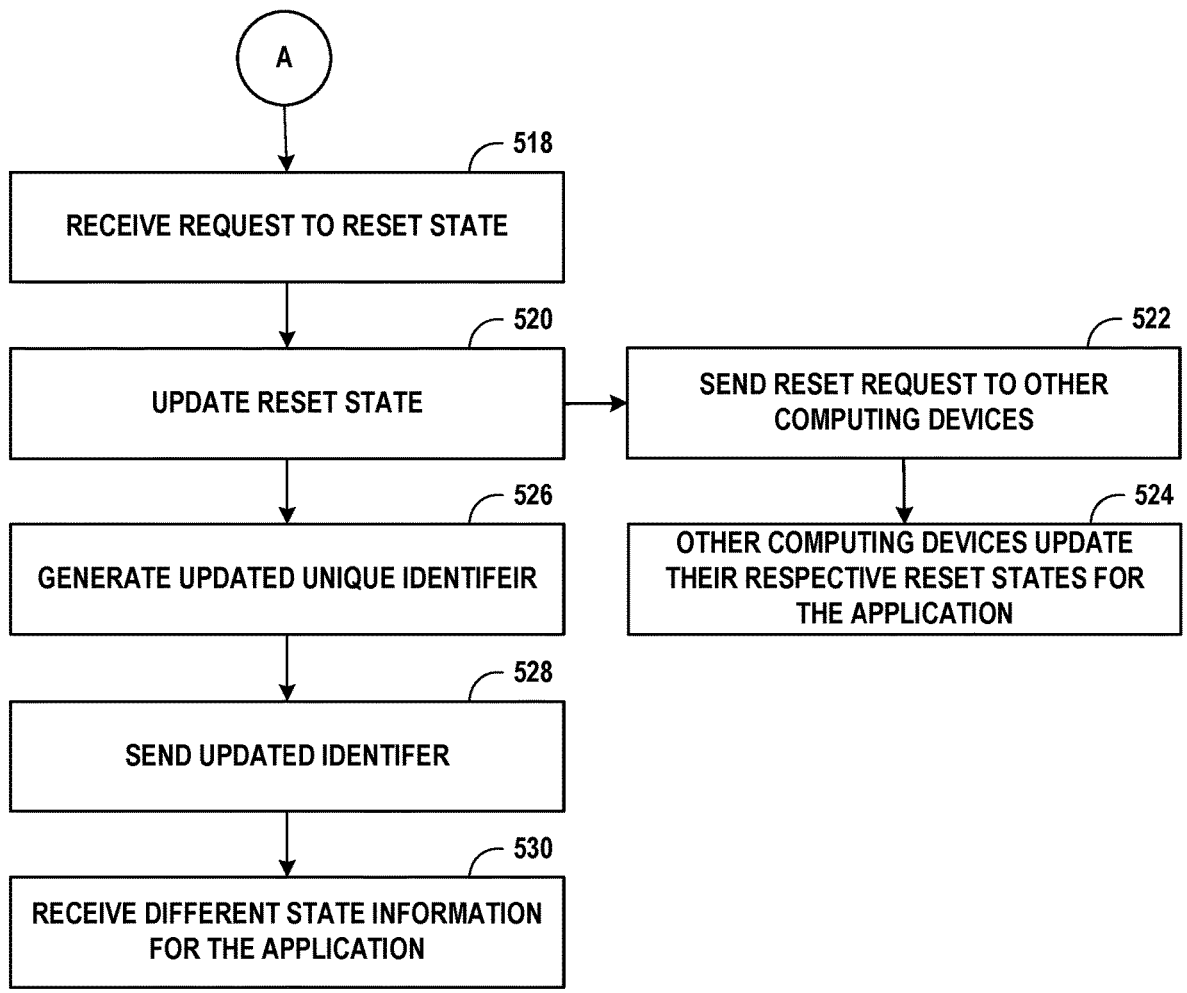

FIGS. 5A and 5B are a flow chart illustrating example operations of a computing device that provides identifiers across application instances, in accordance with techniques of this disclosure. For purposes of illustration only, the example operations are described below within the context of computing system 100 of FIG. 1 and computing device 200 of FIG. 2.

As shown in FIG. 5A, a first computing device (e.g., computing device 200) receives a request to execute particular functionality of an application (500). For instance, a user may provide a user input at computing device 200 to launch the application and supervisor component 228A of computing device 200 may receive an indication of the user input as a request to execute the application. Supervisor component 228A may determine whether an application container for maintaining installable sub-packages of the application (e.g., one of application containers 202, such as application container 202A) is allocated in memory (e.g., one of storage components 348 of FIG. 3) of computing device 200 (502).

Responsive to determining that an application container for maintaining installable sub-packages of the application is not allocated in memory ("NO" branch of 502), computing device 200 may allocated an application container (e.g., application container 202A) (504). For example, computing device 200 may retrieve an application definition from a remote computing system by, for instance, sending a request to the remote computing system that includes a unique identifier for the application. The remote computing system may perform a lookup and identify a corresponding application definition. The remote computing system may send the application definition to computing device 200. Computing device 200 may receive the application definition from the remote computing system and allocate application container 202A in the memory of computing device 200 for the application.

Application container 202A may identify, download, and install one or more sub-packages of the application required to provide the requested functionality (506). For example, if supervisor component 228A previously deallocated application container 202 (i.e., before the current request to execute the application was received by computing device 200), supervisor component 228A may be required to allocate another application container for the application and reinstall one or more of the installable sub-packages required to perform the functionality of the application specified in the current request to execute the application. In this example, the current request to execute the application may be a second or subsequent request to execute the application as supervisor component 228A deallocated the application container previously allocated to the application.

Responsive to allocating the application container in the memory or in response to determining that the application container is already allocated in the memory ("YES" branch of 502), container runtime 224 of application container 202A may determine a current user of computing device 200 (508) and determine the reset state of the application (510). Container runtime 224 may determine the current user of computing device 200 based on a currently logged in user account at computing device 200 or any other mechanism. The reset state of the application may be a current value of a reset state variable, which may be determined by container runtime 224 by loading the value of the reset state variable from a memory of computing device 200.

Container runtime 224 generate a unique identifier using information about the current user (e.g., a user identifier of the current user), an application identifier for the application, and the value of the reset state variable (512). The unique identifier does not include personally identifiable information for the current user, but is usable by application service provider system 170 to uniquely identify the user and the application in order to store and retrieve application state information for the application. Container runtime 224 may generate the unique identifier by, for example, applying a hash function to a tuple that includes a user identifier, an application identifier, and a reset state. In some examples, container runtime 224 further includes salt with the tuple and applies the hash function to the combination of the salt and the tuple.

Computing device 200 sends the unique identifier and one or more request for information to application service provider system 170 (514). The requests for information may include requests for user preference information, application usage information, information about the current state of the application, etc. Computing device 200 receives at least a portion of the requested information (516) and container runtime 224 may configure the application based on the received portion of the requested information.

From time to time, a user of computing device 200 may want to reset the state of the application. For example, the user may have provided the application with personally identifiable information (e.g., in order to make a restaurant reservation, receive navigation instructions, or other functionality of the application), but now desires for the application to no longer have access to the personally identifiable information. As such, computing device 200 receives a request to reset the state of the application (518). The request to reset the state of the application may be an indication of a user input detected by computing device 200 at a location of a presence-sensitive screen at which a graphical element for resetting the state of the application is displayed.

In response to receiving the request to reset the state of the application, container runtime 224 may update the value of the reset state variable (520). For example, container runtime may increment the value of the reset state variable. The next time computing device 200 executes the application, container runtime 224 generates an updated unique identifier using the updated reset state (526). In instances where the current user is the same user and the application is the same application, container runtime 224 will generate a different unique identifier as the reset state portion of the user identifier, application identifier, and reset state tuple has changed. When computing device 200 sends the updated unique identifier to application service provider system 170

(528), computing device 200 will receive different state information for the application than if computing device 200 sent the previous unique identifier (530). Because the update unique identifier is different than the previous unique identifier, application service provider system 170 processes the user as if the user is a different user, such as a new user, of the application. Accordingly, application provider system 170 retrieves different information and sends the different information to computing device 200.

In some instances, computing device 200 may be configured to reset the application state across one or more other computing devices associated with the current user of computing device 200. In such instances, container runtime 224 may cause computing device 200 to send a reset request or command to the other computing devices (522). As one example, computing device 200 may determine which computing devices to which to send the reset request based on computing device identifiers associated with a user account of the current user. The other computing devices, in response to receiving the reset request, reset the state information for the application (524). Typically, after performing the reset, the reset state for the application at the other computing devices is the same as the reset state for the application at computing device 200 such that, if the user executes the application at one of the other computing devices, the unique identifier generated at the other computing device will be the same as the unique identifier generated at computing device 200. In this way, techniques of this disclosure may provide a mechanism by which application state information may be shared across computing devices of a user without requiring the user to provide personally identifiable information.

Example 1. A method comprising: receiving, by a supervisor component executing at a computing device, a request to execute an application; responsive to determining that an application container for maintaining installable sub-packages of the application is allocated in memory of the computing device: determining, by a container runtime of the application container, a current user of the computing device; determining, by the container runtime, a reset state of the application; and generating, by the container runtime and based on the current user of the computing device, the reset state, and an application identifier for the application, a unique identifier that does not include personally identifiable information for the current user; sending, by the computing device and to an application service provider, the unique identifier and one or more requests for information; and responsive to sending the one or more request for information, receiving, by the computing device and from the application service provider, state information associated with the current user and for the application.

Example 2. The method of example 1, wherein the request to execute the application is a first request to execute the application, and wherein the application container is a first application container, the method further comprising: deallocating, by the supervisor component, the first application container for maintaining the installable sub-packages of the application; after deallocating the first application container, receiving, by the computing device, a second request to execute the application; responsive to receiving the second request to execute the application: allocating, by the supervisor component, a second application container for maintaining the installable sub-packages of the application; installing, by the second application container, one or more of the installable sub-packages of the application required to perform functionality of the application specified in the second request to execute the application; determining, by a container runtime of the second application container, an updated current user of the application, wherein the updated current user is the same as the current user; determining, by the container runtime, an updated reset state of the application, wherein the reset state is the same as the updated reset state; generating, by a container runtime of the application container and based on the updated current user and the updated reset state, an updated unique identifier that does not include personally identifiable information for the updated current user, wherein the updated unique identifier is the same as the unique identifier; sending, by the computing device and to the application service provider, the updated unique identifier; and receiving, by the computing device and from the application service provider, the state information associated with the current user and for the application.

Example 3. The method of any combination of examples 1 and 2, wherein the unique identifier is a first unique identifier, and wherein the computing device is a first computing device, the method further comprising: receiving, by a second computing device, a request to execute a different instance of the application; determining, by the second computing device, a current user of the second computing device; determining, by the second computing device, a reset state of the application on the second device; generating, by the second computing device and based on the current user of the second computing device and the reset state of the application on the second device, a second unique identifier that does not include personally identifiable information for the current user, wherein the first unique identifier and the second unique identifier are the same when the reset state and the updated reset state are the same, and wherein the first unique identifier and the second unique identifier are different when the reset state is different from the updated reset state; sending, by the second computing device and to the application service provider, the second unique identifier; and. if the first unique identifier and the second unique identifier are the same, receiving, by the second computing device and from the application service provider, information about the one or more application requests.

Example 4. The method of any combination of examples 1-3, wherein the unique identifier is a first unique identifier, the method further comprising: receiving, by the computing device, a request to reset a state of the application; updating, by the computing device, the reset state of the application; generating, by the computing device and based on the current user of the computing device and the updated reset state of the application, a second unique identifier that does not include personally identifiable information for the current user, wherein the first unique identifier and the second unique identifier are different; and sending, by the computing device and to an application service provider, the second unique identifier such that, after resetting the state of the application, the current user appears to be a different user to the application service provider.

Example 5. The method of example 4, wherein the computing device is a first computing device, and wherein a second computing device is associated with the current user, the method further comprising: sending, from the first computing device and to the second computing device, the request to reset the state of the application; and responsive to receiving the request to reset the state of the application, updating, by the second computing device, the reset state of the application at the second computing device to be the same as the reset state of the application at the first computing device.

Example 6. The method of any combination of examples 1-5, wherein generating the unique identifier comprises hashing a tuple including a user identifier, an application identifier, and a reset state.

Example 7. The method of any combination of examples 1-6, wherein the state information includes one or more of information about a current state of the application, historical application usage information of the current user for the application, and user preference information of the user for the application.

Example 8. A computing device comprising: one or more storage devices that store a supervisor component; and one or more processors that execute the supervisor component to: receive a request to execute an application; and determine whether an application container for maintaining installable sub-packages of the application is allocated in the one or more storage devices, wherein the one or more processors execute the application container to, responsive to determining that an application container for maintaining installable sub-packages of the application is allocated in the one or more storage devices: determine a current user of the computing device; determine a reset state of the application; generate, based on the current user of the computing device, the reset state, and an application identifier for the application, a unique identifier that does not include personally identifiable information for the current user; send, to an application service provider, the unique identifier and one or more requests for information; and, responsive to sending the one or more request for information, receive, from the application service provider, state information associated with the current user and for the application.

Example 9. The computing device of claim 8, wherein: the request to execute the application is a first request to execute the application, the application container is a first application container, the one or more processors execute the supervisor component to: deallocate the first application container for maintaining the installable sub-packages of the application; after deallocating the first application container, receive a second request to execute the application; and responsive to receiving the second request to execute the application, allocate a second application container for maintaining the installable sub-packages of the application; and the one or more processors execute the second application container to: install one or more of the installable sub-packages of the application required to perform functionality of the application specified in the second request to execute the application; determine an updated current user of the application, wherein the updated current user is the same as the current user; determine an updated reset state of the application, wherein the reset state is the same as the updated reset state; generate, based on the updated current user and the updated reset state, an updated unique identifier that does not include personally identifiable information for the updated current user, wherein the updated unique identifier is the same as the unique identifier; send, to the application service provider, the updated unique identifier; and receive, from the application service provider, the state information associated with the current user and for the application.

Example 10. The computing device of any combination of examples 8 and 9, wherein the unique identifier is a first unique identifier, and wherein the one or more processors execute the application container to: receive a request to reset a state of the application; update the reset state of the application; generate, based on the current user of the computing device and the updated reset state of the application, a second unique identifier that does not include personally identifiable information for the current user, wherein the first unique identifier and the second unique identifier are different; and send, to an application service provider, the second unique identifier such that, after resetting the state of the application, the current user appears to be a different user to the application service provider.

Example 11. The computing device of example 10, wherein the one or more processors execute the application container to: send, from the computing device and to a different computing device associated with the current user of the computing device, the request to reset the state of the application, wherein the different computing device, in response to receiving the request to rest the state of the application, updates a reset state of the application at the different device to be the same as the reset state of the application at the computing device.

Example 12. The computing device of any combination of examples 8-11, wherein the one or more processors execute the application container to generate the unique identifier by at least executing the application container to apply a hash function to a tuple including a user identifier, an application identifier, and a reset state.

Example 13. The computing device of any combination of examples 8-12, wherein the state information includes one or more of information about a current state of the application, historical application usage information of the current user for the application, and user preference information of the user for the application.

Example 14. A method comprising: receiving, by a computing system and from an application executing at a first computing device, an identifier that uniquely identifies a user of the first computing device and does not include personally identifying information; receiving, by the computing system and from the application executing at the first computer, one or more requests for information, the one or more requests including a request for user preference information; updating, by the computing system and based on information about the one or more requests and the identifier, one or more historical request information associated with the identifier, the historical information including user preference information associated with the identifier; receiving, by the computing system and from an application executing at a second computing device, the identifier, wherein the application executing on the first computing device and the application executing on the second computing device are different instances of a single application; determining, by the computing system and based on the identifier, user preference information included in the historical request information associated with the identifier; and sending, by the computing system and to the second computing device, at least portion of the user preference information included in the historical request information associated with the identifier.

Example 15. The method of example 14, further comprising: receiving, by the computing system and from the application executing at the first computer, one or more additional requests for the information, the one or more additional requests include a different identifier that uniquely identifies the user of the first computing device and does not include personally identifying information; determining, by the computing system and based on the different identifier, different user preference information included in historical request information associated with the different identifier; and sending, by the computing system and to the second computing device, at least portion of the different user preference information.

Example 16. The method of any combination of examples 14 and 15, further comprising: determining, by the computing system and based on the one or more requests for the information and the identifier, the information; and sending, by the computing system and to the first computing device, at least a portion of the information.

Example 17. The method of any combination of examples 14-16, wherein the historical request information further includes one or more of information about a current state of the application, and application usage information.

Example 18. The method of any combination of examples 14-17, wherein the identifier is generated by at least hashing a tuple including a user identifier, an application identifier, and a reset state.

Example 19. The method of any combination of examples 14-18, wherein the first computing device and the second computing device are the same computing device, and wherein the different instance of the application executing at the second computing device is an instance of the application executing on the same computing device after reinstallation of the application.

Example 20. An apparatus comprising means for performing any combination of the methods of examples 1-8.

Example 21. A computer-readable storage medium encoded with instructions that, when executed, cause one or more processors of a computing device to perform any combination of the methods of examples 1-8.

Example 23. An apparatus comprising means for performing any combination of the methods of examples 14-19.

Example 24. A computer-readable storage medium encoded with instructions that, when executed, cause one or more processors of a computing device to perform any combination of the methods of examples 14-19.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method comprising:
   receiving, by a computing device, a request to execute an application;
   responsive to receiving the request to execute the application, determining, by the computing device a current user of the computing device;
   determining, by the computing device, a reset state of the application, wherein the reset state of the application is a value that remains the same between different execution instances of the application and changes each time the current user of the computing device requests that a state of the application is reset;
   generating, by the computing device and based on the current user of the computing device, the reset state, and an application identifier for the application, a unique identifier that does not include personally identifiable information for the current user;
   sending, by the computing device and to an application service provider, the unique identifier and one or more requests for information; and
   responsive to sending the one or more request for information, receiving, by the computing device and from the application service provider, state information associated with the current user and for the application.

2. The method of claim 1, wherein the unique identifier is a first identifier, and wherein the computing device is a first computing device, the method further comprising:

receiving, by a second computing device, a request to execute a different instance of the application;

determining, by the second computing device, a current user of the second computing device;

determining, by the second computing device, a reset state of the application on the second device;

generating, by the second computing device and based on the current user of the second computing device and the reset state of the application on the second device, a second identifier that does not include personally identifiable information for the current user, wherein the first identifier and the second identifier are the same when the reset state of the application on the first device and the reset state of the application on the second device are the same, and wherein the first identifier and the second identifier are different when the reset state of the application on the first device is different from the reset state of the application on the second device;

sending, by the second computing device and to the application service provider, the second identifier; and if the first identifier and the second identifier are the same, receiving, by the second computing device and from the application service provider, information about the one or more application requests.

3. The method of claim 1, wherein the unique identifier is a first identifier, the method further comprising:

receiving, by the computing device, a request to reset a state of the application;

updating, by the computing device, the reset state of the application;

generating, by the computing device and based on the current user of the computing device and the reset state of the application, a second identifier that does not include personally identifiable information for the current user, wherein the first identifier and the second identifier are different; and sending, by the computing device and to an application service provider, the second identifier such that, after resetting the state of the application, the current user appears to be a different user to the application service provider.

4. The method of claim 3, wherein the computing device is a first computing device, and wherein a second computing device is associated with the current user, the method further comprising:

sending, from the first computing device and to the second computing device, the request to reset the state of the application; and responsive to receiving the request to reset the state of the application, updating, by the second computing device, the reset state of the application at the second computing device to be the same as the reset state of the application at the first computing device.

5. The method of claim 1, wherein generating the unique identifier comprises hashing a tuple including a user identifier, an application identifier, and a reset state.

6. The method of claim 1, wherein the state information includes one or more of information about a current state of the application, historical application usage information of the current user for the application, and user preference information of the user for the application.

7. The method of claim 1, further comprising:

determining, by the computing device, whether the application has been requested by the current user within a threshold amount of time;

responsive to determining that a portion of the functionality of the application has not been requested within the threshold amount of time, uninstalling, by the computing device, the application.

8. The method of claim 7, further comprising:

after uninstalling the application, receiving, by the computing device, another request to execute the application; and responsive to receiving the other request to execute the application:

reinstalling, by the computing device, the application; and setting, by the computing device, a current state of the application to a state of the application at the time the application was uninstalled.

9. A computing device comprising:

one or more storage devices that store instructions; and one or more processors that execute the instructions to:

receive a request to execute an application;

determine a reset state of the application, wherein the reset state of the application is a value that remains the same between different execution instances of the application and changes each time a current user of the computing device requests that a state of the application is reset;

generate, based on the current user of the computing device, the reset state, and an application identifier for the application, a unique identifier that does not include personally identifiable information for the current user;

send, to an application service provider, the unique identifier and one or more requests for information; and responsive to sending the one or more request for information, receive, from the application service provider, state information associated with the current user and for the application.

10. The computing device of claim 9, wherein the unique identifier is a first identifier, and wherein the one or more processors execute the instructions to:

receive a request to reset a state of the application;

update the reset state of the application;

generate, based on the current user of the computing device and the reset state of the application, a second unique identifier that does not include personally identifiable information for the current user, wherein the first unique identifier and the second identifier are different; and send, to an application service provider, the second unique identifier such that, after resetting the state of the application, the current user appears to be a different user to the application service provider.

11. The computing device of claim 10, wherein the one or more processors execute the instructions to:

send, from the computing device and to a different computing device associated with the current user of the computing device, the request to reset the state of the application, wherein the different computing device, in response to receiving the request to rest the state of the application, updates a reset state of the application at the different device to be the same as the reset state of the application at the computing device.

12. The computing device of claim 9, wherein the one or more processors execute the instructions to generate the unique identifier by at least executing the instructions to apply a hash function to a tuple including a user identifier, an application identifier, and a reset state.

13. The computing device of claim 9, wherein the state information includes one or more of information about a current state of the application, historical application usage information of the current user for the application, and user preference information of the user for the application.

14. The computing device of claim 9, wherein the one or more processors further execute the instructions to:
- determine whether the application has been requested by the current user within a threshold amount of time;
- responsive to determining that the portion of the functionality of the application has not been requested within the threshold amount of time, uninstall the application; after uninstalling the application, receive another request to execute the application; and
- responsive to receiving the other request to execute the application:
  - reinstall the application; and
  - set a current state of the application to a state of the application at the time the application was uninstalled.

15. A non-transitory computer-readable storage medium encoded with instructions that, when executed by one or more processors of a computing device cause the one or more processors to:
- receive a request to execute an application;
- determine a reset state of the application, wherein the reset state of the application is a value that remains the same between different execution instances of the application and changes each time a current user of the computing device requests that a state of the application is reset;
- generate, based on the current user of the computing device, the reset state, and an application identifier for the application, a unique identifier that does not include personally identifiable information for the current user;
- send, to an application service provider, the unique identifier and one or more requests for information; and
- responsive to sending the one or more request for information, receive, from the application service provider, state information associated with the current user and for the application.

16. The non-transitory computer-readable storage medium of claim 15, wherein the unique identifier is a first unique identifier, and wherein the instructions further cause the one or more processors to:
- receive a request to reset a state of the application;
- update the reset state of the application;
- generate, based on the current user of the computing device and the reset state of the application, a second unique identifier that does not include personally identifiable information for the current user, wherein the first unique identifier and the second identifier are different; and
- send, to an application service provider, the second unique identifier such that, after resetting the state of the application, the current user appears to be a different user to the application service provider.

17. The non-transitory computer-readable storage medium of claim 16, wherein the instructions further cause the one or more processors to:
- send, from the computing device and to a different computing device associated with the current user of the computing device, the request to reset the state of the application, wherein the different computing device, in response to receiving the request to rest the state of the application, updates a reset state of the application at the different device to be the same as the reset state of the application at the computing device.

18. The non-transitory computer-readable storage medium of claim 15, wherein the instructions further cause the one or more processors to generate the identifier by at least executing the instructions to apply a hash function to a tuple including a user identifier, an application identifier, and a reset state.

19. The non-transitory computer-readable storage medium of claim 15, wherein the state information includes one or more of information about a current state of the application, historical application usage information of the current user for the application, and user preference information of the user for the application.

20. The non-transitory computer-readable storage medium of claim 15, wherein the instructions further cause the one or more processors to:
- determine whether the application has been requested by the current user within a threshold amount of time;
- responsive to determining that a portion of the functionality of the application has not been requested within the threshold amount of time, uninstall the application; after uninstalling the application, receive another request to execute the application; and
- responsive to receiving the other request to execute the application:
  - reinstall the application; and
  - set a current state of the application to a state of the application at the time the application was uninstalled.

* * * * *